(12) United States Patent
Giese et al.

(10) Patent No.: US 6,728,267 B1
(45) Date of Patent: Apr. 27, 2004

(54) SERVICE CAPABLE NETWORK

(75) Inventors: Peter Arnold Giese, Kinburn (CA); Allen Foster Eddisford, Stittsville (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/220,019

(22) Filed: Dec. 23, 1998

(51) Int. Cl.[7] .................................................. H04J 3/16
(52) U.S. Cl. ...................................................... 370/469
(58) Field of Search .............................. 370/469, 466, 370/467; 709/230

(56) References Cited

U.S. PATENT DOCUMENTS

| | | | | |
|---|---|---|---|---|
| 5,003,470 A | * | 3/1991 | Carpenter et al. | 709/227 |
| 5,289,469 A | * | 2/1994 | Tanaka | 370/469 |
| 5,329,619 A | | 7/1994 | Pagé et al. | 395/200 |
| 5,428,607 A | | 6/1995 | Hiller et al. | 370/60.1 |
| 5,448,566 A | * | 9/1995 | Richter et al. | 370/431 |
| 5,509,123 A | | 4/1996 | Dobbins et al. | 395/200.15 |
| 5,579,309 A | | 11/1996 | Totzke | 370/58.2 |
| 5,583,929 A | | 12/1996 | Ardon | 379/230 |
| 6,172,990 B1 | * | 1/2001 | Deb et al. | 370/474 |
| 6,556,586 B1 | * | 4/2003 | Sipila | 370/469 |

FOREIGN PATENT DOCUMENTS

| | | | |
|---|---|---|---|
| WO | WO 97/07638 | 2/1997 | H04Q/3/00 |

OTHER PUBLICATIONS

MultiMedia Communications Forum, Inc., Reference Architecture Model Specifications, 1995.

Alcatel–Telecom, TINA 6, Tutorial 3, Sep. 2, 1996.

Network Resource Architecture Version 3.0, Telecommunications Information Networking Architecture Consortium (TINA–C), Feb. 1997.

Service Architecture Version 5.0, Telecommunications Information Networking Architecture Consortium (TINA–C), Jun. 16, 1997.

Paper: "Application of TINA–C Computing and Service Architecture Concepts to the Development of an Advanced Information Brokerage Service in the Context of EC", Asensio et al, IEEE, 1998.

Paper Enhanced Communications Services Synopsis Paper V1.0, Jul. 18, 1998.

Kun Suk Kim et al: "Multimedia Data Transfer for Supporting Middleware Service", ICCT 1996 International Conference on Communication Technology Proceedings, pp. 191–196, vol. 1.

* cited by examiner

Primary Examiner—Chi Pham
Assistant Examiner—Alexander O. Boakye
(74) Attorney, Agent, or Firm—Max R. Wood; Ogilvy Renault

(57) ABSTRACT

A service capable telecommunications network permits a communications network user, user agent or another network simplified access to network communication services, based on a clear separation of transported payload information, network-based communications enhancing and enabling services, and physical network transport. Functions, functional layers and coupling of both functions and functional layers enable a simplified choice of, and access to, communication services to meet user requirements.

22 Claims, 26 Drawing Sheets

Communication Services Interaction Primitives

Figure 1 Network Layers

Figure 2 Communication Services Interaction Primitives

Figure 3. Functional Partitioning

Figure 4  Communications Services Layer Structure

Figure 5a  Enhanced Services - Functional View

| Management Services | Transport Services | | Connectivity Services | QoS Services |
|---|---|---|---|---|
| • Provisioning<br>• Policy Definition<br>• Maintenance<br>• Security<br>  • Authentication<br>• Billing Records | • Sharing<br>  • Token Ring<br>  • Collision Detection<br>  • Virtual Path<br>• Partitioning<br>  • Burst<br>  • Stream | • Conversion<br>  • Bearer Transport<br>  • Hand-off Control | • Session-Based Mgmt<br>  • Edge-to-Edge<br>  • Nodal<br>• Session Migration<br>• Message-Based Mgmt<br>• Route Selection<br>• Port Selection | • QoS Mapping<br>  • Connectivity<br>  • Resource<br>• Policy Mgmt<br>  • Parameter Selection<br>  • Execution Engines |
| |                                     Direct Line of the Path | | | |
| • Activation Mgmt | • Termination<br>  • Terminal<br>  • Trunk<br>• Interchange<br>  • Switching<br>  • Forwarding | • Concentration<br>  • Mux<br>  • Ring<br>  • Bus<br>  • Bit Carriage<br>  • Synchronous<br>  • Asynchronous | • Secure QoS Resources<br>  • Circuit Connections<br>  • Packet Reservations<br>• Privacy | • QoS Binding<br>• Control Usage<br>  • Enforcement<br>  • Recording<br>• Path Monitoring<br>  • Power levels<br>  • Bit Error rates<br>  • Traffic |

Figure 5b  Primary Services - Functional View

Figure 7  Exemplary Communication Primitives

Figure 8 Use of Primitives in the Service Capable Network

Figure 9   Layer Interface Constructs

Figure 10 Exemplary Match Broker

Figure 11 Exemplary Negotiating Broker

Figure 12 Contract Representations from Broker Elements

Figure 13 Different Types of sessions

Figure 14    Forms of Sessions

Figure 15 Broker - Session Standard Behavior

Fig 16 SCN Profiles

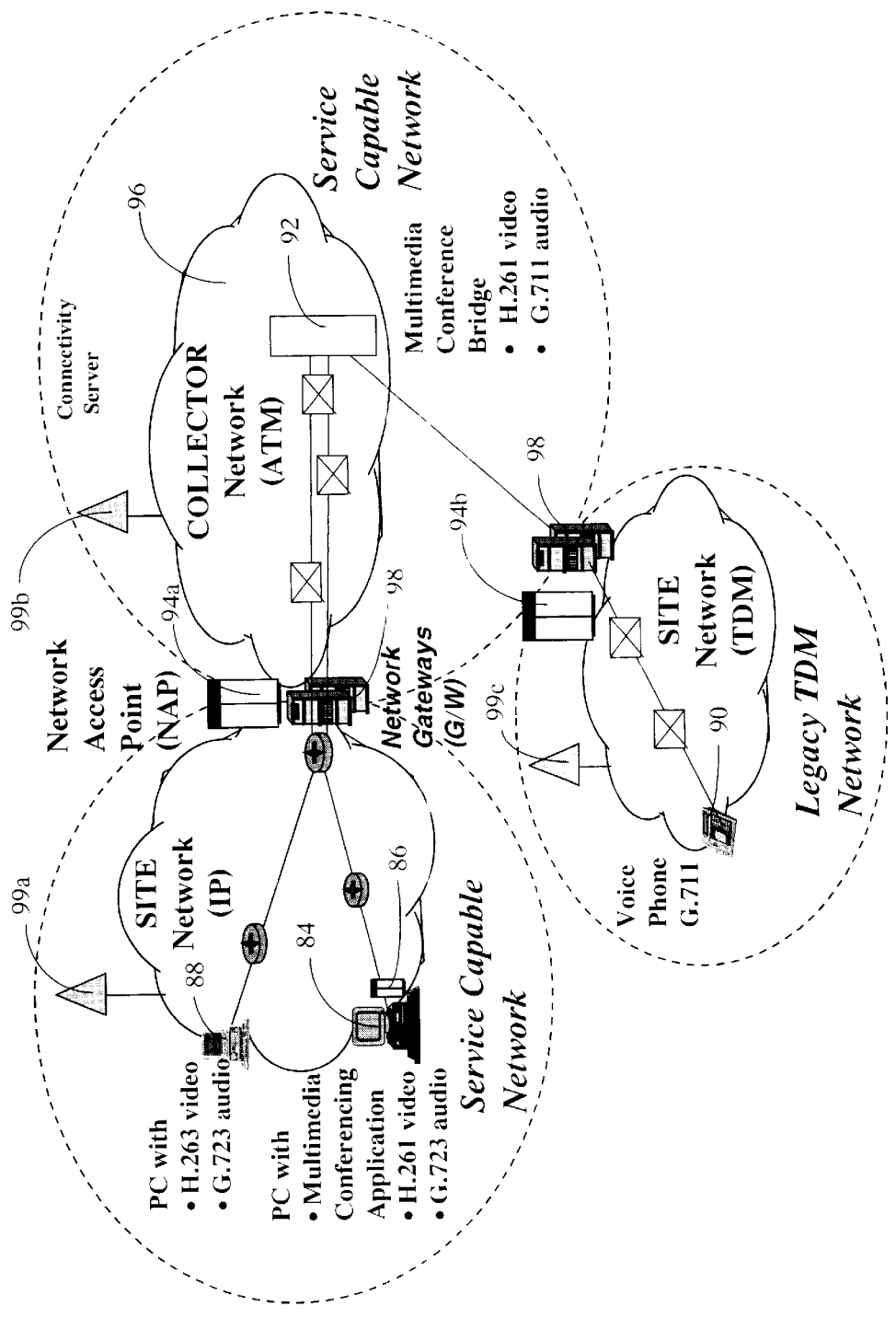
Figure 18 Exemplary Call Walk-through Network Topology

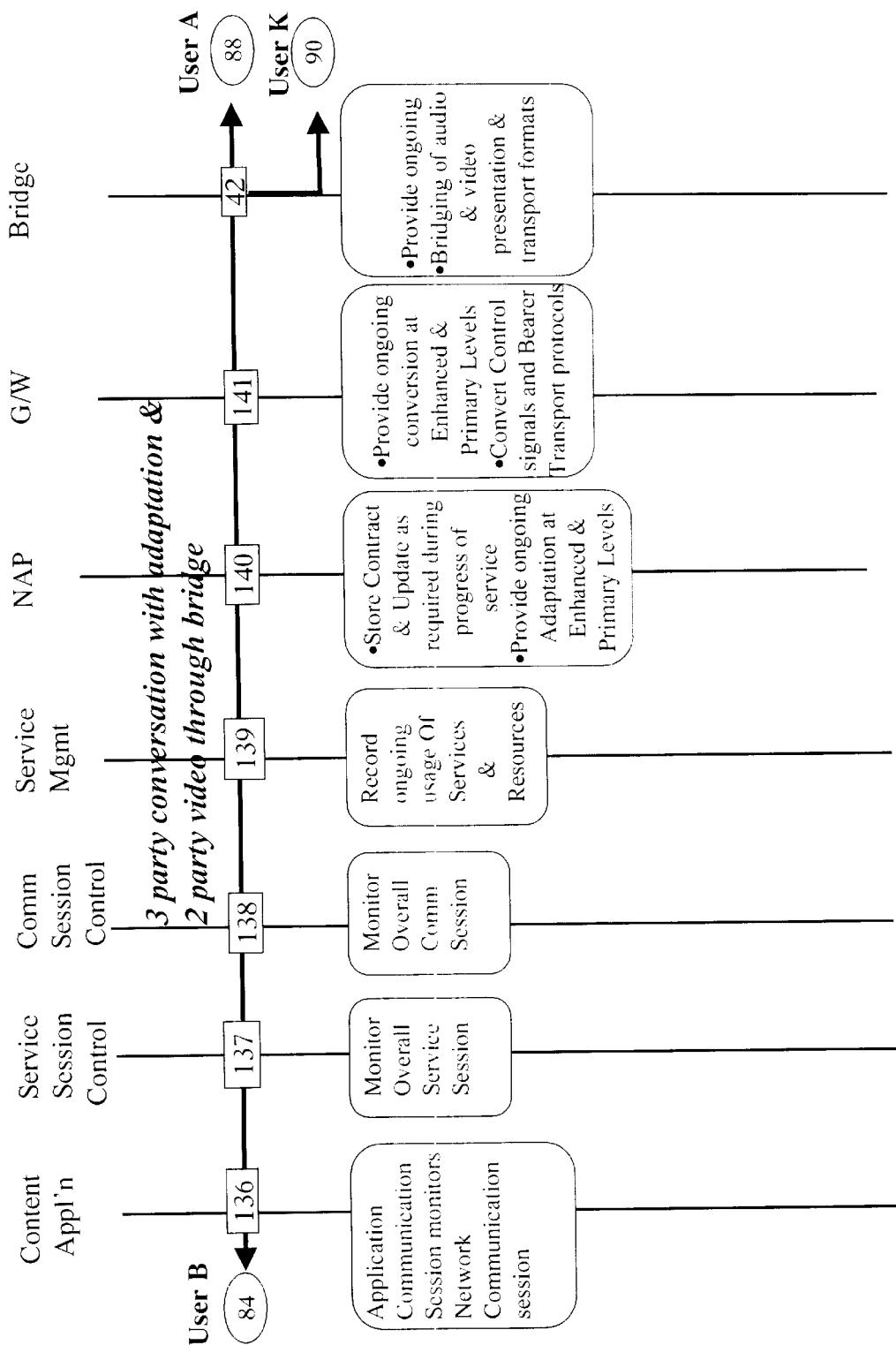
Figure 19d Conference Active Phase

| Net | Term | Srce | Dest | Type | Adaptations Enh | Pri | Bridge Enh | Pri | Conditioning (conversions) Enh | Pri |
|---|---|---|---|---|---|---|---|---|---|---|
| IP Site | (88) | (88) | (98) | Fdx Video | (94a) | - | (92) | - | - | (98) |
| | | (88) | (94a) | Fdx Audio | G.723-G.711 | - | - | - | - | IP-AAL |
| | | (94a) | (98) | Fdx Audio | - | - | - | - | - | IP-AAL |
| | (84) | (84) | (98) | Fdx Video | - | - | - | - | - | IP-AAL |
| | | (84) | (94a) | Fdx Audio | G.723-G.711 | - | - | - | - | IP-AAL |
| | | (94a) | (98) | Fdx Audio | - | - | - | - | - | IP-AAL |
| ATM Coll | (88) | (98) | (92) | Fdx Video | - | - | H.263-H.261 | - | - | - |
| | | (98) | (91) | Fdx Audio | - | - | - | - | - | - |
| | (84) | (98) | (92) | Fdx Video | - | - | H.263-H.261 | - | - | - |
| | | (98) | (92) | Fdx Audio | - | - | - | - | - | - |
| TDM Site | (90) | (98) | (92) | Fdx Audio | (94b) Proxy Client | - | - | - | - | - |
| | (90) | (90) | (98) | Fdx Audio | - | - | - | - | - | TDM-AAL |

Assumes CCS7 Throughout (99a) (99b) (99c) (Note 1.)

Notes: 1. A network signaling protocol change between networks to Enhanced &/or Primary layers would nmormally requre conditioning at intervening Gateways. However, for the purposes of this walk-through CCS7 has been assumed for both layers thoroughout so no Signaling Conditioning is required.

Figure 20

SERVICE CAPABLE NETWORK

TECHNICAL FIELD

This invention relates to communications networks and, in particular, to a novel service capable network designed to meet the requirements of modern users of communications services and to permit the opportunity for communications service growth.

BACKGROUND OF THE INVENTION

Communications networks have historically been constructed using models and protocols as guides. Networking models and protocols have proliferated over the past few years as new networks have been introduced or existing networks have evolved to accommodate new end-user, device and application requirements. The proliferation of networking models has been manifested in monolithic, highly integrated network and network component architectures. Functionality and products developed for a target group of end-users, devices or applications are almost invariably not readily extendible to another network without extensive modification or complete re-creation. New networks cannot capitalize on functionality and protocols developed for previous networks because monolithic integrated designs do not permit porting. Current networks provide limited choice of services and the choices available are often difficult to access. Adding functionality to current networks requires complex modifications of existing functionality. The time required to do these modifications is incompatible with modern competitive communications business environment where the speed to market greatly influences total revenues earned.

Modern voice communications networks have evolved in the twentieth century with a focus on creating universal telephone services. Currently, a revolution in telecommunications is underway that holds the promise of providing ubiquitous service for multimedia applications. Modern networks are in need of an enabling interoperability infrastructure, just as in the past computers were in the need of a data network. It is widely recognized that networking solutions need to take into account increasingly more powerful edge devices and content services that are currently available or are under development.

Others have recognized this need and contributed to the design of network architectures aimed at providing ubiquitous access to multimedia services. For example, the Telecommunications Information Networking Architecture Consortium (TINA-C) have produced a document entitled Service Architecture Version: 5.0 dated Jun. 16, 1997. The TINA-C architecture stems from a guiding principle arising from market, industry and sociological trend analysis. The key trends analyzed in devising the architecture include: layering the network architecture to move application and service logic out of transport nodes and specific telecommunications technologies to higher level entities; providing telecommunications in a multi-player, multi-provider environment; and, user choice of telecommunication services. The TINA-C architecture is a three macro-layer view of the network that assumes a middleware distributed processing environment, and utilizes an Open Distributed Processing (ODP) environment similar to that defined by the Object Management Group (OMG). The TINA-C architecture advocates technology independent views of transport elements and connections by representing both abstractly. It also includes the concept of a communications broker used to match communication services in the middle layer and transport layers with user specifications. Communications can be effected across federated, heterogeneous networks and conversion occurs at network edges as a part of the Resource Partition Layer. The Conversion, referred to as adaptation is an automated process which may not be user selected.

Another network architecture was proposed by the MultiMedia Communications Forum, Inc. in a paper entitled Reference Architecture Model Specifications dated 1995. The purpose of the document is to provide a framework for the structure of the integrated services required by distributed multimedia applications. The focus is on the aspects of the architectural model that support multimedia communication applications such as multimedia conferencing and multimedia information service. The underlying technology is not of primary focus. The MMCF architectural framework consists of logical domains which offer a set of services and their respective functions. The partitioning addresses the complex problem of communicating between distributed application processes. Each domain is accessed by functions in other domains through an open interface referred to as an Application Program Interface (API) The open interface shields each domain from the specific (characteristics,of the functions and services provided by other domains. Thus, the specification of domains may evolve with changing technology without directly impacting other domain specifications. Within this model resides a manager entity, associated with the application, middleware, media device and transport domains to manage information flow sent/received from the network and delivered to the end-user.

The MMCF reference architecture model consists of a user presentation layer, an application domain layer, a middleware domain layer, and a lower layer which is divided into a media device domain sector and a transport domain sector. APIs are provided between each of the four layers to enable inter-layer communications. Communications are handled in a trickle-down, trickle-up format in which direct communication appears to be enabled only between adjacent layers. User applications must therefore traverse each intervening layer in order to initiate a communication session regardless of the simplicity of the user's requirement. This leads to complication in network infrastructure and contributes to costs and decreases efficiency.

There therefore exists a need for a layered service capable network which enables access to each respective layer in the network from a network edge or from an adjacent layer in order to ensure the flexibility required to satisfy the communications requirements of a diverse community of users and to permit efficient inter-working of federated networks. There also exists a need for a layered network having layers that may be utilized as self-standing entities and owned by separate business entities.

SUMMARY OF THE INVENTION

It is an object of the invention to provide a service capable network based on a layered network model in which layers of functionality are clearly separated.

It is a further object of the invention to provide a service capable network model in which brokers act on behalf of user applications or adjacent networks to find acceptable service offerings on demand.

It is yet a further object of the invention to provide a service capable network in which primitives that reflect natural, recurrent communications needs are used to provide simple network interfaces to exploit network-provided capabilities.

It is a further object of the invention to provide a service capable network in which network functionality is partitioned into transport path independent functions, transport path associated functions and functions in a direct line of the path.

It is a further object of the invention to provide a service capable network in which content adaptation transforms either or both of the presentation and transport aspects of encoded content format without requiring detailed knowledge of its meaning.

It is yet a further object of the invention to provide a service capable network in which conditioning provides bi-directional conversions between representations when entering or exiting the network.

It is yet a further object of the invention to provide a service capable network in which the brokers take user service and policy information communicated through primitives and use the information to select a service provider for a communication session.

It is yet a further object of the invention to provide a service capable network in which proxy clients augment conditioning by creating primitives from content and connectivity information to permit brokers to be employed.

It is yet a further object of the invention to provide a service capable network in which the brokers may be matching brokers or negotiating brokers.

It is another object of the invention to provide a service capable network in which directory services enable user and device tracking to permit the accommodation of mobile, transient and stationary users.

The invention therefore provides a service capable communications network for enabling communications between sources and sinks, comprising:

a first logical layer for providing network functions, the first logical network layer being partitioned into multi-nodal services which may be accessed by users, user agents or adjoining networks using a first set of primitives which permit interaction with the first logical network layer functionality to initiate and control the multi-nodal services;

a second logical layer for providing node functions, the second logical layer being partitioned into nodal services which may be accessed by users, user agents, the first logical network layer multi-nodal services or adjoining networks using a second set of primitives which permit interaction with the second logical layer functionality to initiate and control communication paths and support transport functionality; and the first and second logical layers have a recursive layer structure.

The first and second logical layers of the service capable network (SCN) in accordance with the invention are respectively referred to as the "enhanced services layer" and the "primary services layer". The enhanced and the primary services layers have a recursive layer structure. As used in this document, "recursive network layer structure" means a substantial duplication of functionality between logical layers in the network, the duplication being limited only to an extent required to adapt to differences in functionality in respective network layers. The SCN functionality is further partitioned into transport path independent functions; transport path associated functions; and functions in a direct line of the path. Partitioning communications services into functions as they relate to path maximizes flexibility and accommodates diversity of network layer ownership. The functionality is further partitioned into edge-related and non-edge-related categories. Successful partitioning permits independent businesses to evolve and operate around aspects of functionality, if so desired.

In the SCN, user applications or adjacent networks may use brokers to isolate posted service offerings that satisfy their communication needs. As a communication session is established, the brokers complete sections of an electronic contract which is preferably presented to the user application by the user-facing service provider. The electronic contract governs the communication session and stipulates the compensation owed to the service provider(s) involved in the transport of the payload, as well as any service provider(s) involved in related services such as conditioning or conversions of payload data.

The SCN also supports mobile, transient and stationary users and devices using directory services which store user and device profiles that permit any user or device in the network to be located.

BRIEF DESCRIPTION OF THE DRAWINGS

The invention will now be explained by way of example only and with reference to the following drawings, wherein:

FIG. 18 is a schematic diagram of a network topology used to illustrate a call walk-through in the service capable network;

FIGS 19a–19f are call walk-through diagrams illustrating an exemplary call walk-through of a communications session in the service capable network; and FIG. 20 is a table showing connection samples for the call walk-through illustrated in FIGS. 19a–19f.

DETAILED DESCRIPTION OF THE PREFERRED EMBODIMENT

Figure 1:
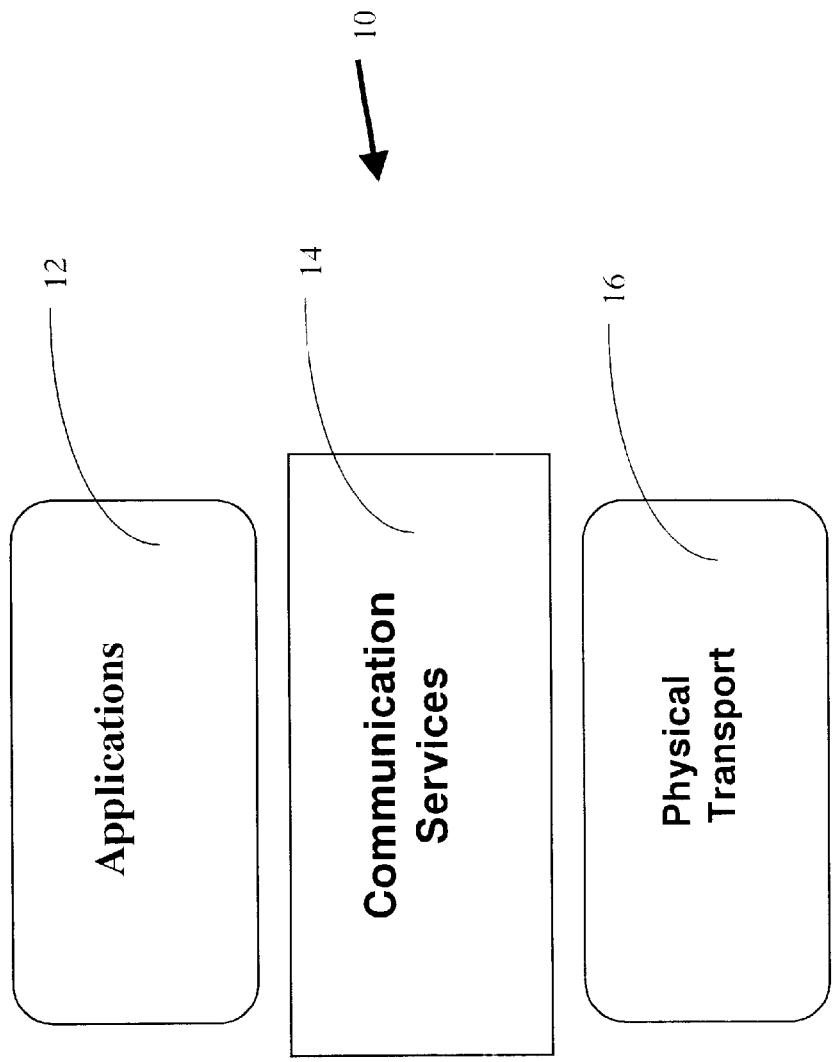
FIG. 1 is a schematic diagram of a service capable communications network partitioned into layers in accordance with the invention.

The invention provides a Service Capable Network (SCN) based on a layered network model and the principle that there is a clear separation between the layers of functionality in the network. FIG. 1 illustrates the layers of functionality in a SCN 10 in accordance with the invention. The SCN layers consist of:

1) user application functionality referred to as content layer 12 that generates payload information to be moved by the network;

2) a communications services layer 14 provided by the network; and 3) a physical transport layer 16 consisting of the transport node hardware and interconnecting links, such as fibre-optic links that carry payload generated by the content layer 12.

Although the SCN 10 is schematically illustrated as including the content layer 12, the services layer 14 and the physical transport layer 16, the invention relates specifically to the services layer 14 and the interfaces between the services layer and the applications layer.

Figure 2:
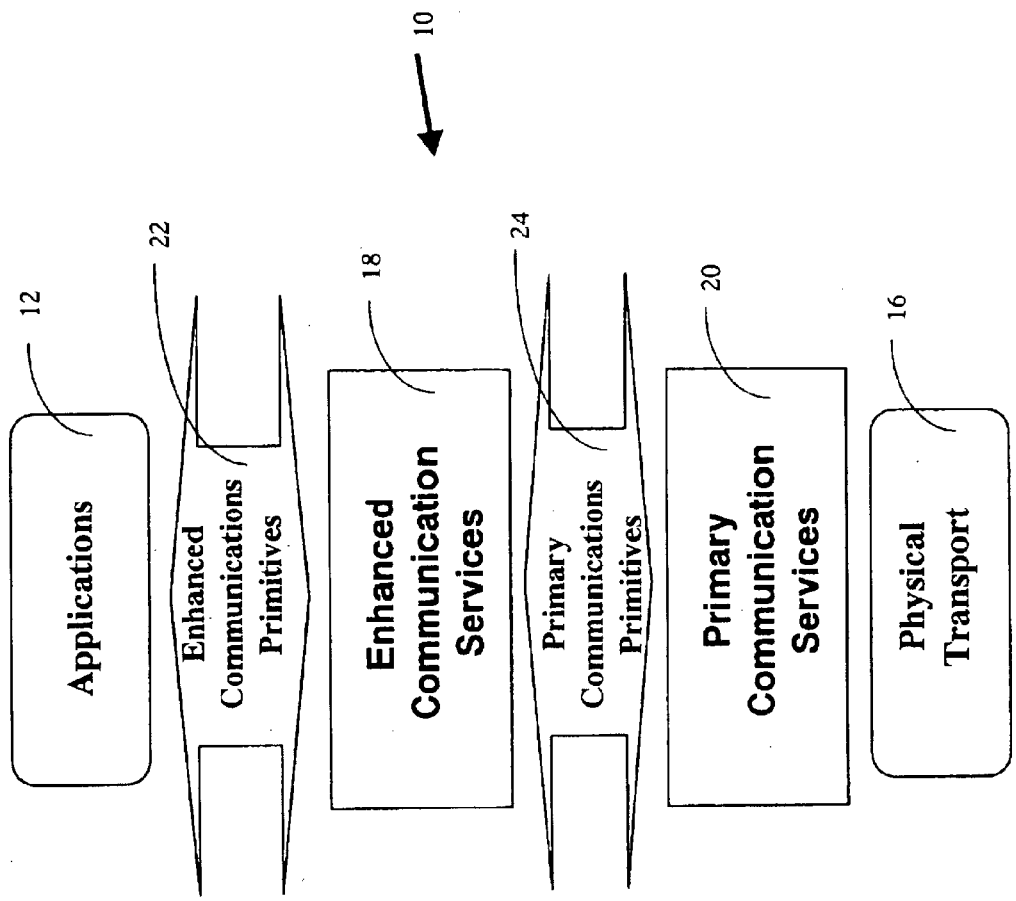
FIG. 2 is a schematic diagram showing how the communications services are further partitioned into enhanced communications services and primary communications services and communications primitives enable information exchanges between the respective layers.

FIG. 2 shows the partitioning of the communications services layer 14 into enhanced communications services 18 and primary communications services 20. The enhanced communications services 18 add communications value furnished by the SCN 10. The primary communications services 20 control the physical transport of payload generated by the content layer 12. The enhanced and primary communications service layers are accessed through interface messaging schemes called enhanced communications primitives 22 and primary communications primitives 24. The enhanced communications services layer 18 and the primary communications services layer 20 along with the associated primitives are the primary focus of the SCN 10 in accordance with the invention.

Partitioning network functionality into the above-described layers reduces the development time and complexity associated with introducing new capabilities into the network. Network-provided services have been traditionally bundled into underlying transport technologies. Consequently, modifying or adding services required changes to many different technologies often required software and/or equipment modifications to each node in a legacy network. Porting services between legacy networks of different technologies was difficult, if not impossible. The SCN 10 repartitions network functionality, both in terms of horizontal layer separation and in terms of edge and core concentrations to minimize the impact of ongoing evolution and change.

Partitioning network functionality into layers also permits functionality within individual layers to be evolved independently of other layers. Furthermore, the SCN 10 simplifies access to network services using the enhanced communications primitives 22 and the primary communications primitives 24 that reflect natural, recurrent communications needs. The communications primitives 22, 24 provide user and application programmers with simpler network interfaces than exist in legacy networks in order to exploit new network-provided capabilities, as will be explained below in more detail.

The SCN 10 also provides users, applications or user agents with access to, and means of executing choice in selecting a diversity of service suppliers and network functionality that best meets their communication needs. The SCN 10 is designed to accommodate a larger number of service providers participating in federated communications networks which are expected to evolve in response to deregulation and increased competition. In addition, the functional separation of networks into the enhanced communications services layer 18 and the primary communications services layer 20 will permit a number of new service provider offerings to emerge in the SCN 10. The SCN 10 will also permit end-users or their agents to dynamically exploit the diversity in capabilities and pricing associated with different technologies employed by those service providers.

The SCN 10 also provides transparent interoperability between stationary, nomadic and mobile end-users, devices and applications within and across networks, as will also be explained below in more detail.

FUNCTIONAL PARTITIONING

Figure 3:
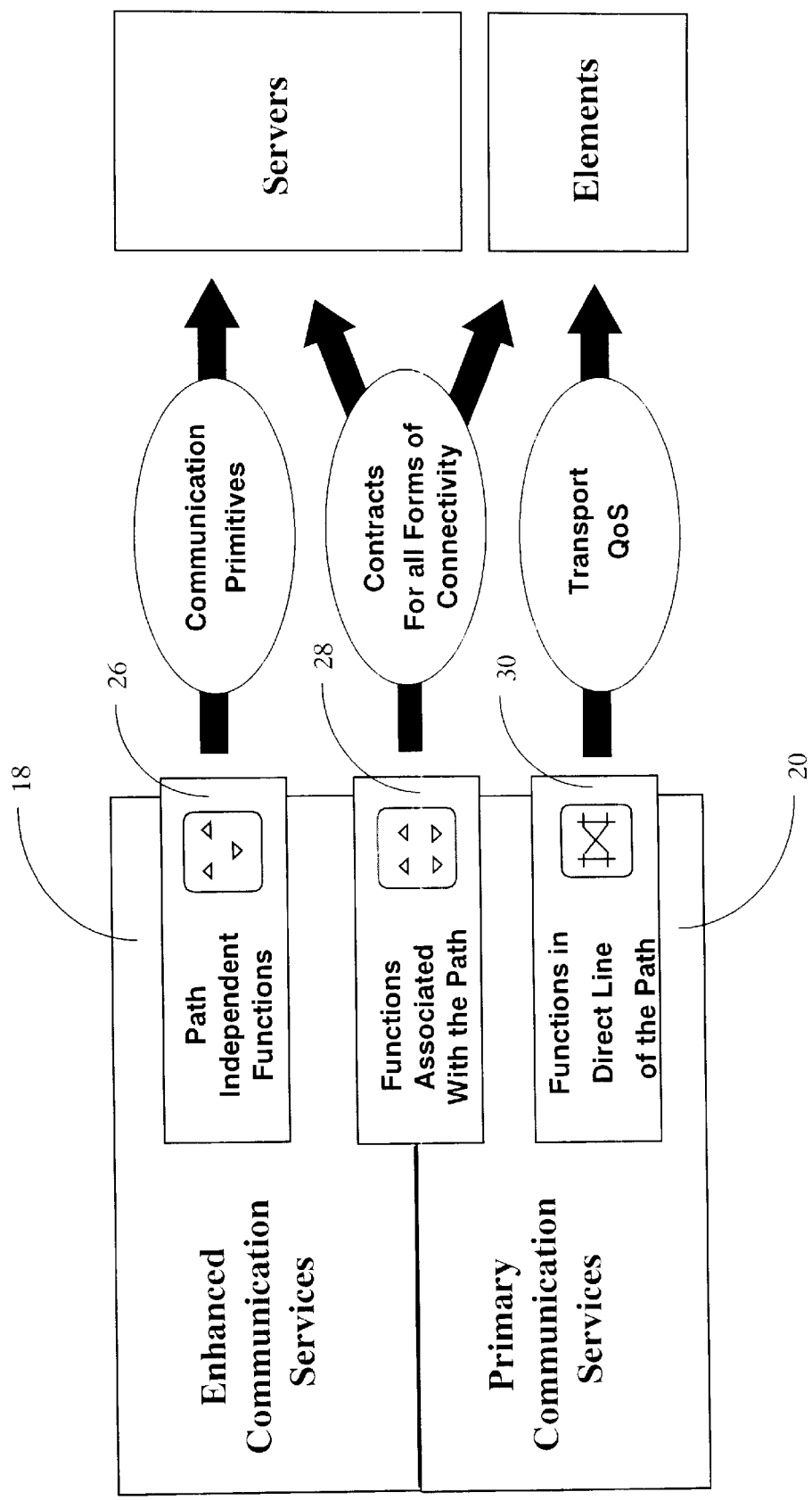
FIG. 3 is a schematic diagram of the functional partitioning in the enhanced communications services layer and the primary communications services layer showing how functionality is further partitioned into path independent functions, functions associated with a path and functions in a direct line of a path.

In the SCN 10, communications services 14 have been further partitioned into functions in order to maximize flexibility. FIG. 3 illustrates Path. related functional partitioning. In order to maximize centralization of common network-wide service logic, with the intention of limiting the impact of service upgrades, evolution and portability, it is necessary to partition network functionality into transport path independent functions 26, transport path associated functions 28 and functions in direct line of the path 30. Furthermore, some control functions need not be dependent on any particular path technology and can be distributed independently of node or path elements. This partitioning must be undertaken recognizing and accommodating the diversity of network layer ownership that may ensue.

Functions partitioned in this manner can also be grouped and classified into edge related and non-edge related categories. The classification is one of function and not one of location within the network.

Successful partitioning allows independent businesses to evolve and operate around aspects of functionality. Thus, ownership must be considered when partitioning. Network functions are preferably partitioned into groups of functions (layers) that can be separately owned, managed and operated.

Communications Services Layer

Figure 4:
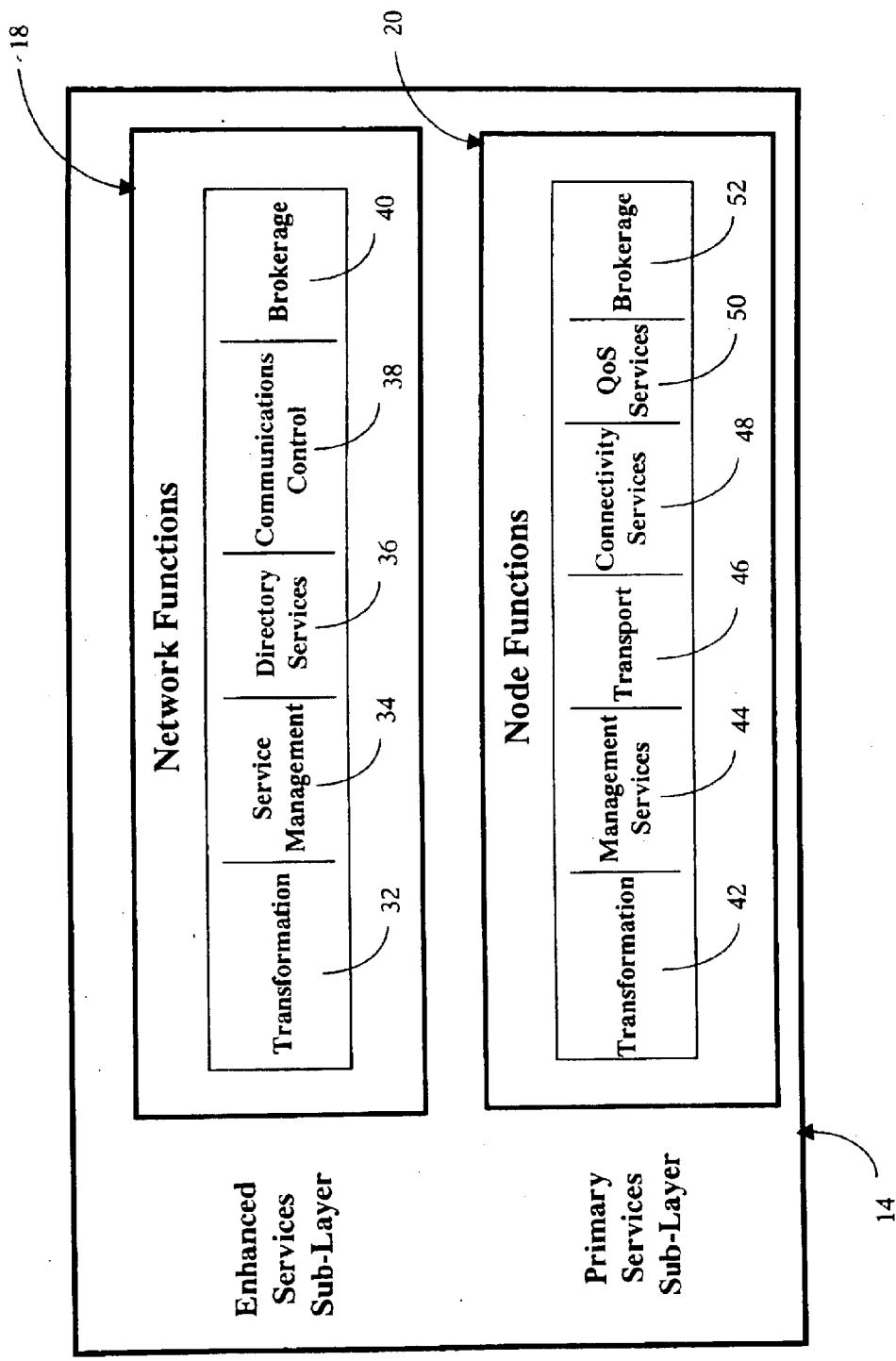
FIG. 4 shows the communications services layer structure for the enhanced services sub-layer and the primary services sub-layer.

Communications Services is the essence of the invention and provides network wide negotiation, navigation, orchestration, inter-operation and resource binding for services. FIG. 4 illustrates the composition of this layer. The layer contains the Enhanced 18 and Primary 20 Service sub-layers.

Enhanced Services Sub-layer

Enhanced Services provides network functions. This sub-layer is partitioned into the following: Transformation Services 32, Service Management 34, Directory Services 36, Communications Control 38 and Brokerage 40. Enhanced Services are concerned with multi-nodal aspects of communications. Each of the functional partitions 32–40 are further subdivided into Path Independent and Path Associated functionality. Path Independent functionality consists of pooled high level network edge, navigational and inter-operation capabilities implemented by means of service and network abstractions. Path associated functions allow services to carry out end-to-end communications using path level abstractions. Transformation 32 and brokerage 40 represent functionality in the edge centric category while the remaining functional partitions service management 34, directory services 36 and communications control 38 are non-edge centric.

Exemplary Path Independent functionality in each partition is as follows: Transformation services 32 includes content format conversions necessary to enable diverse users or user agents to inter-operate. Service Management 34 provides recognition of users, devices and applications and the association of services contracted to them. Either basic transport, or more complex preset special services, may be invoked for individuals or groups. An example of a group service is virtual private networking (VPN). Directory Services 36 entail an automatic compilation of network-wide naming, addressing, locating and route topology information as well as providing the conversion algorithms that can be used for translation between representations used by different sub-networks. Communications Control 38 provides preset communications configurations such as those required for multicasting or for VPNs, in addition to providing life cycle and service control for any configuration invoked. Both message and session modes for connection oriented and connectionless communications are supported. Brokerage services 40 enable end user selection of services in the enhanced services sub-layer 18.

Figure 5:
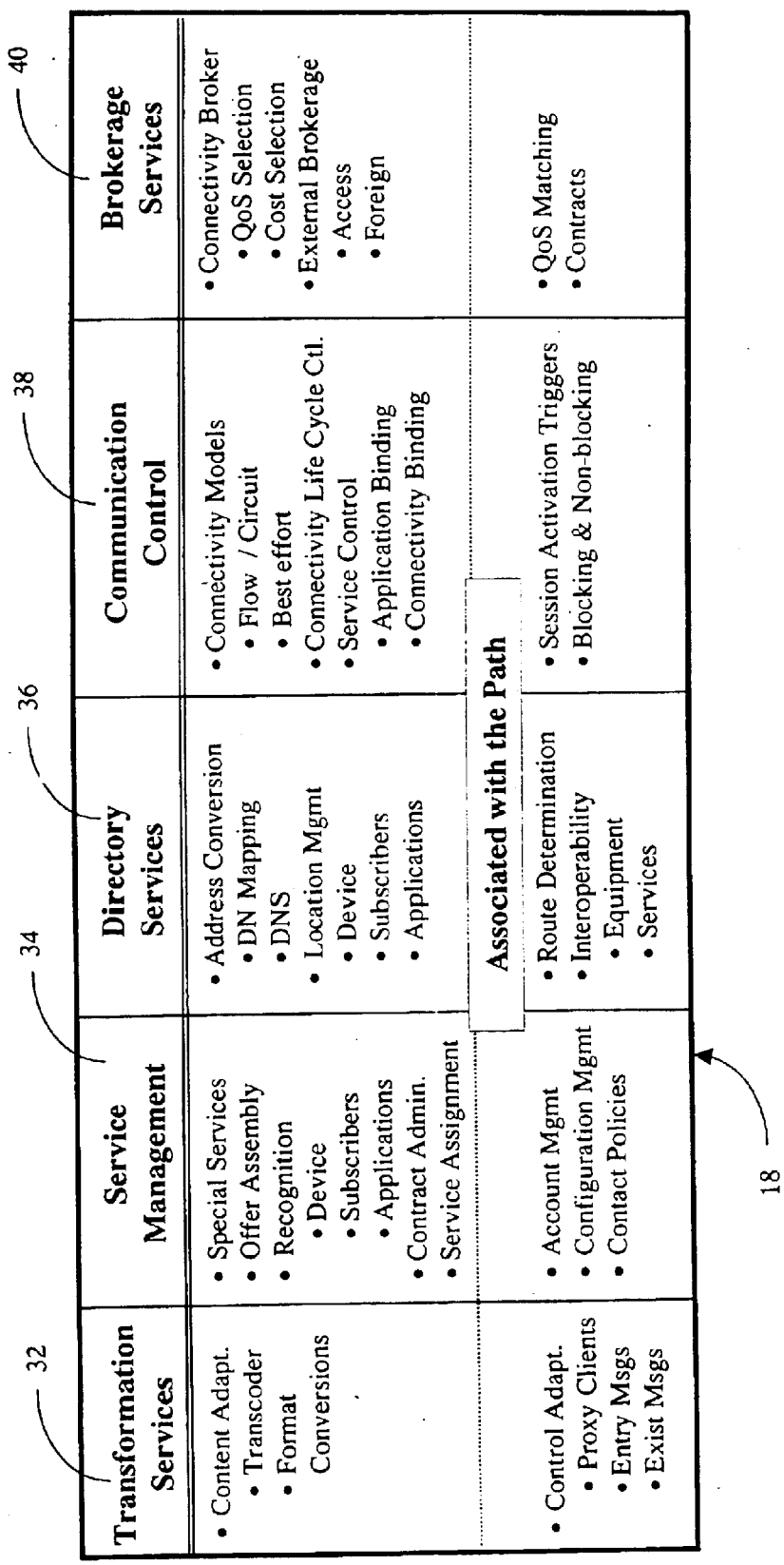
FIG. 5a is a table showing examples of the functional partitioning of the enhanced services sub-layer.
FIG. 5b is a table showing examples of the partitioning of functions in the primary services sub-layer.

Exemplary Path Associated functionality in each partition is as follows: Transformation 32 includes path edge conditioning and proxy clients. Path edge conditioning consists of the control adaptation, message generation, message interpretation required for inter-working between external systems and the enhanced services layer 18. Proxy clients adapt non-conformant legacy external systems (such as PSTN POTS) so that they can utilize the capabilities of the enhanced services layer 18. Service Management 34 consists of service configuration, account and policy management. Network management is just another service, albeit a privileged one, that is substantially automated through contracts as will be described below in more detail. Directory Services 36 encompass route selection and interoperability resolution for equipment and services in the communications path. Communications Control 38 provides path session activation mechanisms. Brokerage services 40 enable selection of end-to-end communications paths of the appropriate qualities-of-service and provides assembly of contract details for the enhanced sub-layer. FIG. 5a provides exemplary functionality in each partition of the enhanced services layer 18.

Primary Services Sub-layer

The Primary Services sub-layer 20 provides node functions that permit end-users, user agents, adjoining networks and the enhanced services layer 18, to utilize nodal communications paths. Primary services include path control and node support functionality. As shown in FIG. 4, functionality is partitioned into the following categories: Transformation Services 42, Management Services 44, Transport Services 46, Connectivity Services 48, QoS Services 50 and Brokerage Services 52.

Exemplary Node Controller based functionality in each category is as follows: Transformation services 42 include path level format and protocol conversions and primary layer proxy clients which will be described below. Management Services 44 encompass provisioning, policy definition, maintenance, security and billing recording. Transport services 46 include invoking and controlling bandwidth sharing, bandwidth partitioning, hand-off and concentration. Connectivity services 48 consist of nodal session and message management as well as selection of local ports and routes using QoS services 50. QoS Services 50 entail policy management as well as securing and binding resources to satisfy QoS requests. QoS services 50 implement a universal set of QoS abstractions that permit end-users, user agents, enhanced services 18 or adjoining networks to initiate, maintain and terminate communications paths over any of a variety of transport technologies. Brokerage services 52 encompass selection of primary resources for meeting QoS and policy objectives as well as assembly of electronic contract details for the Primary services sub-layer 20.

Exemplary physical functions in nodes are as follows: Transformation services 42 includes conditioning capabilities like bit stream shaping and flow control. Management Services 44 include physical component activation. Transport services 46 consist of port termination, interchange, and bit carriage. Connectivity services 48 include physical encryption. QoS services 50 entails path monitoring and usage control. FIG. 5b illustrates partitioning of exemplary functions in the primary communications services layer 20.

Only the Primary Services layer 20 contains functions actually in the direct line of the path, and therefore tied to, or built into, network nodes. All other functions are preferably implemented on Connectivity Servers in the enhanced services layer 18 or the primary services layer 20. Server partitioning is primarily determined by ownership criteria.

End users, applications or user software agents, as well as adjoining networks can individually access each of the enhanced services layer 18 and primary services layer 20 in the SCN 10. Adjoining networks access these same layers in a layer peer-to-peer relationship. End users, applications or user agents can also access the layers as a top-down stack with the enhanced services layer 18 acting as a gateway to the primary services layer 20. In fact, services within the enhanced services layer 18 can generate primary communications primitives 22 without end-user direct knowledge of their creation and use as the enhanced services layer 18 executes services on a user's behalf.

Figure 6:
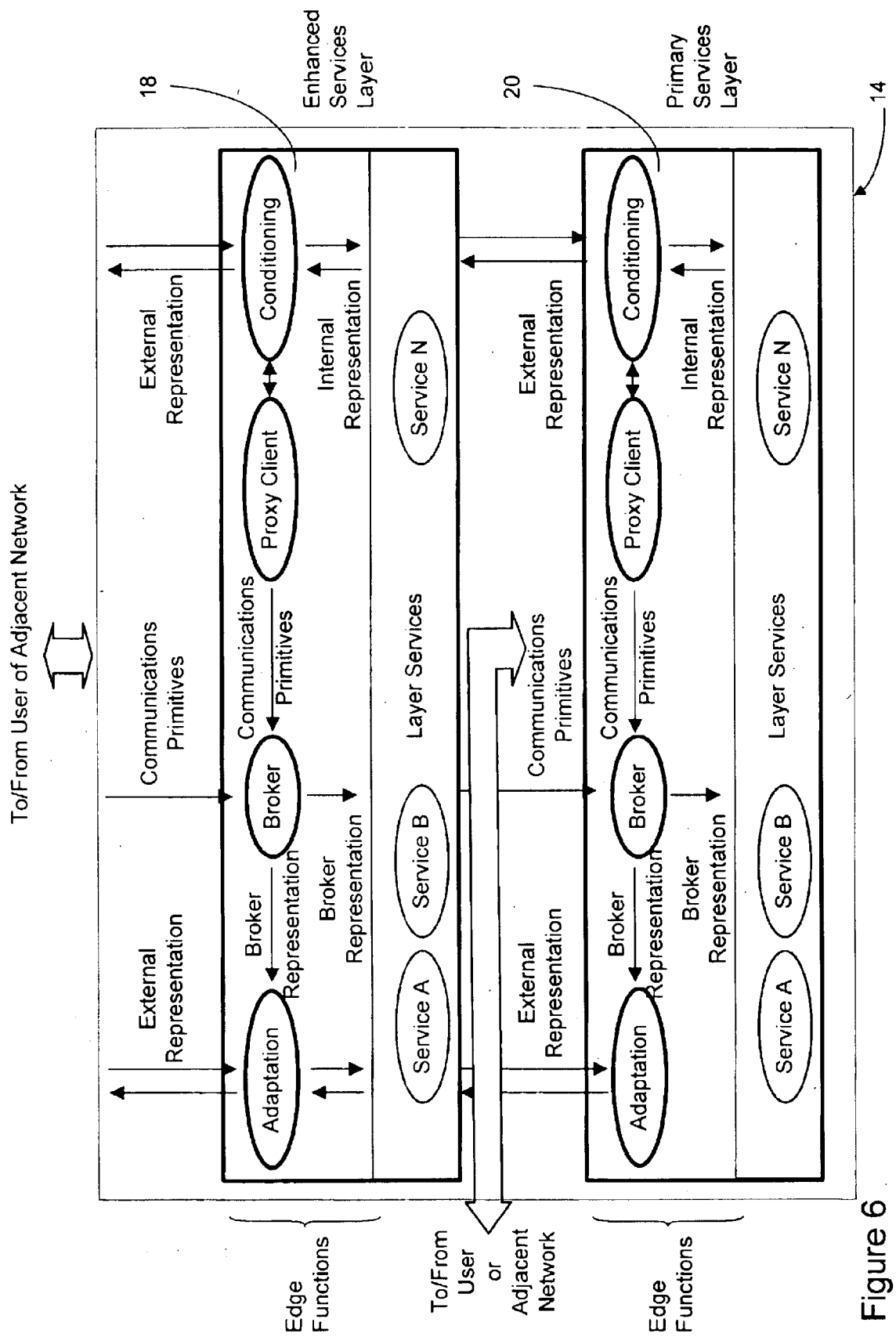
FIG. 6 is a schematic diagram illustrating communications services layer interface constructs.

FIG. 6 illustrates the relationship of the enhanced services layer 18 and primary services layer 20, their interfaces and internal functional partitioning into edge and non-edge related services. Layer interface constructs are discussed further in a section which follows entitled "Layer Interface Constructs".

Communications Primitives

Figure 7:
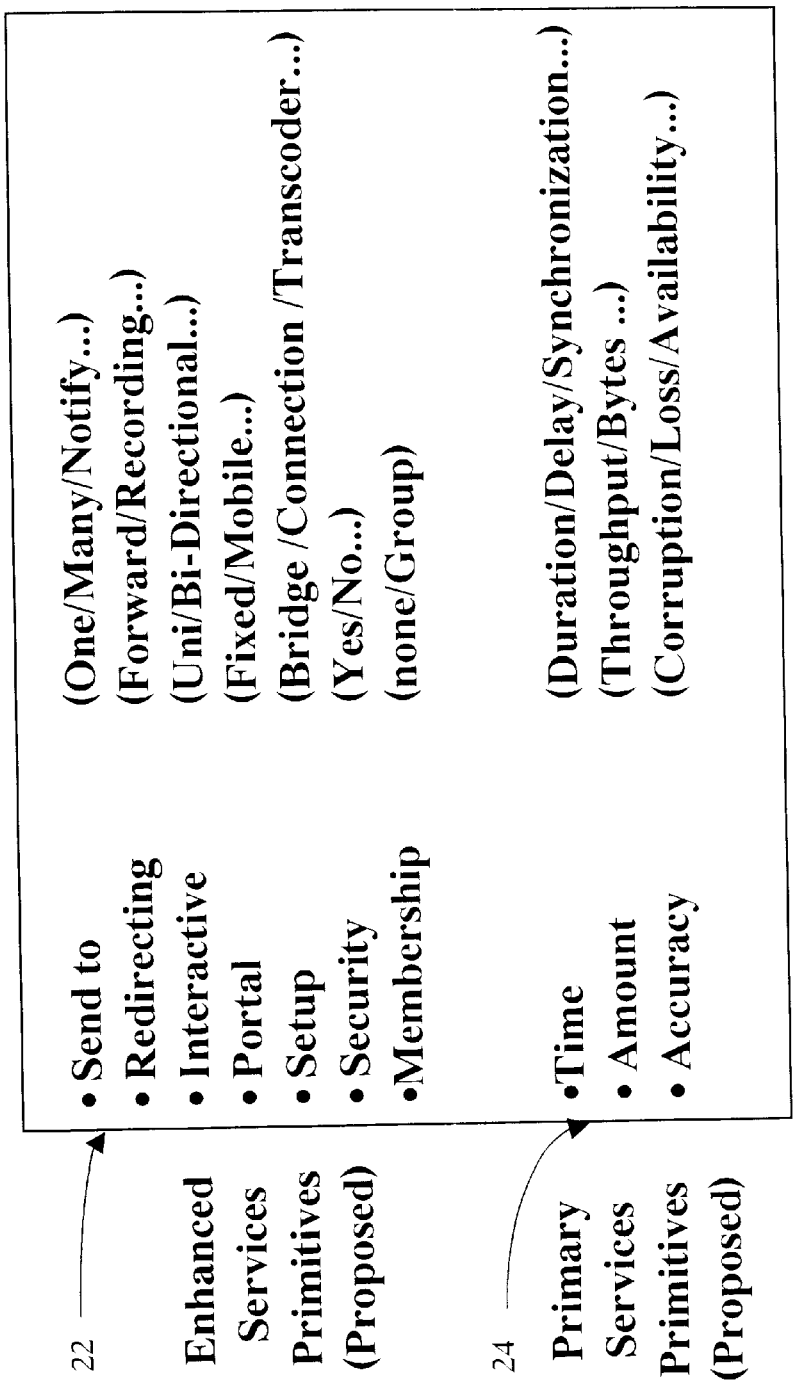
FIG. 7 is a schematic diagram illustrating exemplary communications primitives used in the service capable network.

User applications in the content layer 12 and enhanced communication services layer 18 interact using enhanced communication primitives 22 (FIG. 2). The enhanced communications services layer 18 and primary communication services layer 20 interact using primary communication primitives 24. FIG. 6 shows how primitives 22, 24 are communicated across layer boundaries to interact with layer edge functionality as well as within layers between edge functions. FIG. 7 shows examples of both enhanced and primary communications primitives 22, 24. The list of examples shown in FIG. 7 is exemplary only and not intended to be exhaustive.

Enhanced communications primitives 22 are abstractions that enable users, user agents or adjoining networks to interact with the SCN 10 to initiate, maintain and terminate communication services for a wide variety of content. The enhanced communications primitives 22 consist of basic instructions sent to the network, and subsequent responses returned by the network to enable dialog with enhanced services layer functions. The primitives enact fundamental communication behaviours from which more complex services can be derived.

Primary communications primitives 24 are similar abstractions that enable users, user agents, enhanced communications services layer 18 functionality or adjoining networks to interact with the primary services layer 20 of the network. Primary communication services, in turn, implement Universal Class or Quality-of Service Primitives that permit network services to initiate, maintain and terminate communications paths over any of a variety of transport technologies. Network services are unaware of transport technology.

Communications primitives 22, 24 employ a syntax that is universally recognizable by users. Primitives cover the semantics of user-network control information exchanges encompassing; (a) user and provider policy information, (b) communication service selections, (c) content adaptation selections, (d) and qualities-of-service selections. Different primitive messages are used within the enhanced communications services layer 18 and the primary communications services layer 20, and between different functions within the layers 18, 20.

Figure 8:
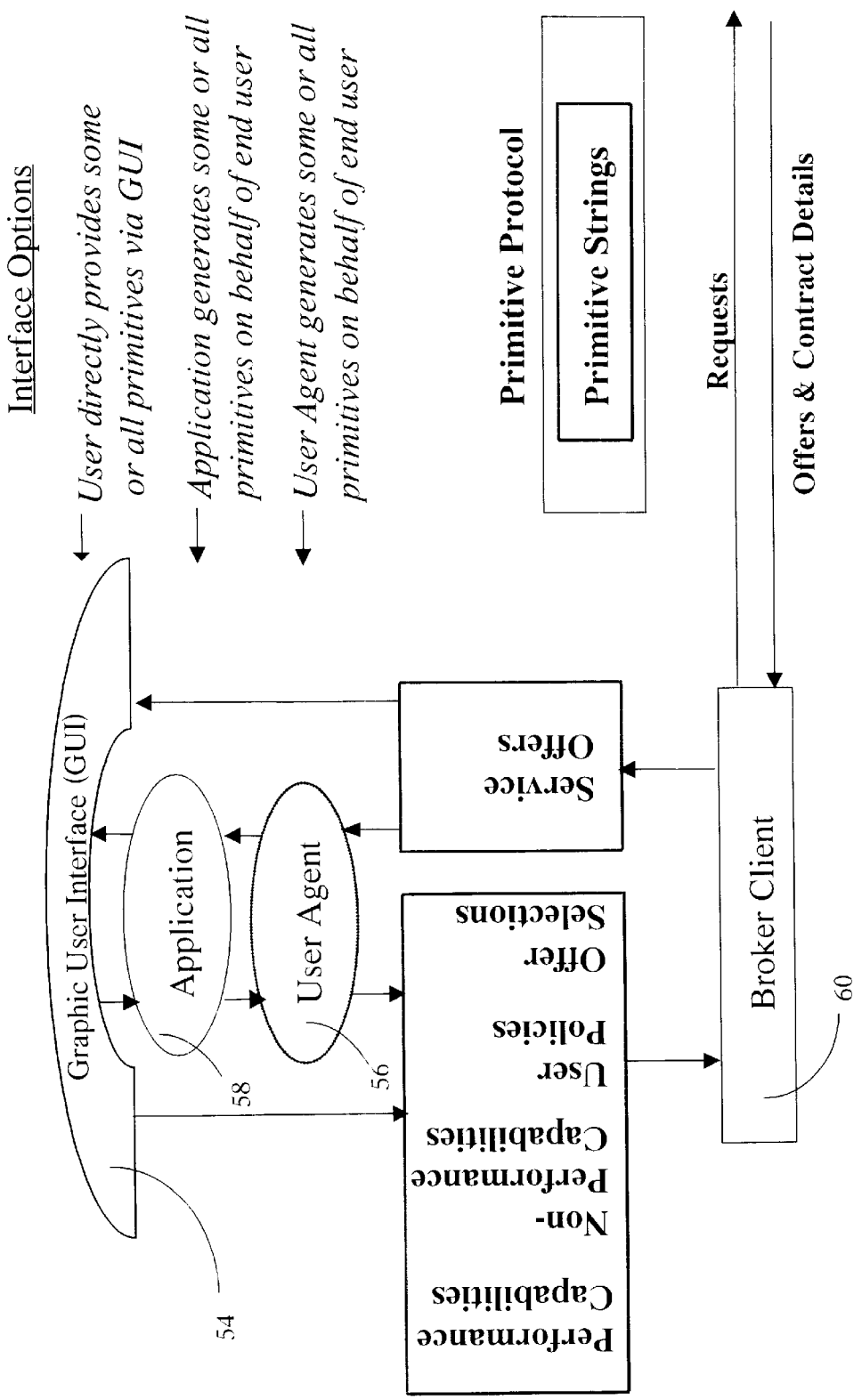
FIG. 8 is a schematic diagram showing the use of communications primitives in the service capable network.

Communications primitives must be simple and easy to use and, for the most part, concise and limited in number. Their format is not unlike software language instructions in that they consist of an 'instruction code' part followed by one or a string of arguments. Simplicity and ease of use is required because they are intended for use by a diverse population of software application programmers and graphic user interface (GUI) designers. Further, they are intended to embody requests and responses to fundamental communication services provided by the SCN 10 that can be used to construct more complicated communications applications by end-users or third party service suppliers. Because the couplings between network layers must be designed to be amenable to separate layer ownership, the primitives 22, 24 must be easy to implement and must be exposable to different parties. FIG. 8 illustrates how end users 54, user agents 56 and applications 58 can interface to a broker client 60 that may reside directly within the end-users terminal or, in the case of an optional user agent 56, may reside within a network entity and act as an agent "docking station". Primitives 22, 24 are interpreted by the broker client 60. The broker client 60, in turn, interacts with a broker server (not shown) residing on a network server. SCN 10 compatible terminals may directly house brokers.

Layer Interface Constructs

Figure 9:
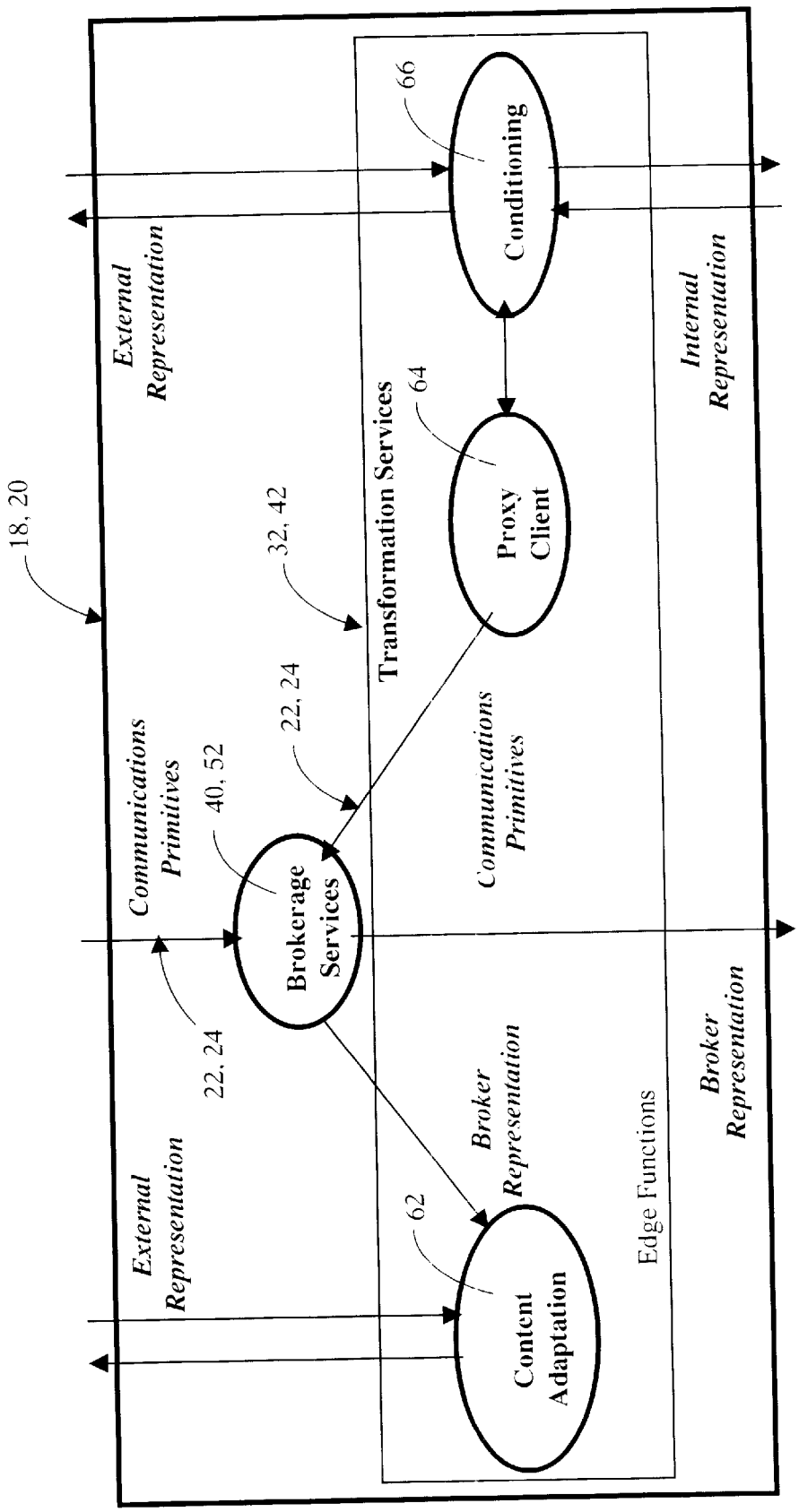
FIG. 9 is a schematic diagram illustrating layer interface constructs used in the service capable network.

Transformation services 32, 42 and brokerage services 40, 52 provide the network edge functionality required to enter or to exit the enhanced communications services layer 18 and primary communications services layer 20. Brokerage services permit the SCN 10 to offer services choice in each network layer (enhanced and primary services layers). Further, the SCN 10 is designed to support peering relationships across service providers and technologies in each layer. Because each layer is relatively self-contained (i.e. can be separately owned, managed and operated), offering choice and simple interfacing at the network edge enables the use of similar structures in each layer (i.e. Brokerage services 40, 52 and Transformation services 32, 42 [Conditioning, Adaptation and Proxy Clients]. The enhanced communications services layer 18 and the primary communications services layer 20 therefore contain substantially the same recursive macro-structures. Consequently, some of the functional components of the structures in each of the layers may be built the same. However, the particular algorithms and/or data used in individual layers will differ because the services provided in each layer are dependent on the physical structures that support the respective layers. FIG. 9 illustrates Layer Interface Constructs. FIG. 6 outlines how content layer users, user agents, adjoining layers and interfacing networks interact with enhanced and primary layers to use the constructs.

Transformation Services

Transformation services include content adaptation 62, proxy clients 64 and conditioning 66.

Content adaptation 62 may be either provisioned or requested using primitives 22, 24. Content adaptation transforms either or both of the presentation and transport aspects of encoded content format without requiring detailed knowledge of its meaning. The purpose of this functionality is to provide a network service that allows dissimilar user devices, user agents or applications to inter-work. Content adaptation 62 includes bi-directional conversions for information transfer between parties. Content adaptation 62 is distinct from application gateways where content must be interpreted to permit dissimilar entities to inter-work.

Proxy clients 64 augment conditioning 66 by creating primitives 22, 24 from content and connectivity information to permit brokerage services 40, 52 to be employed. The SCN 10 is designed to be most cost effective, operationally efficient and user responsive when brokerage services 40, 52 are used. Proxy clients 64 provide the means for adapting legacy applications, devices and networks to operate with the SCN 10. Proxy clients 64 are special instances of applications where content is examined in order to derive communications primitives 40, 52.

Conditioning 66 provides bi-directional conversions between representations when entering or exiting the SCN 10. Conditioning 66 cleanly separates content information, which may then be moved transparently through the network. Conditioning also includes signal and transport protocol conversions as well as information stream shaping. Conditioning function are found in each of the enhanced and primary layers. Conditioning, in itself, does not require the use of a broker.

Brokerage Services

Brokers take user service and policy information, communicated through primitives 22, 24, and look for a match against service provider services and policies. If a match is found, the brokers populate a contract with details within their scope of search and then go on to initiate communications services. Depending on their scope, brokers can perform straight matching against offered services, resources and policies or can undertake negotiations to achieve a contractible alternative to user requests.

Interface Functional Examples

Examples of the use of Interface constructs are included in Tables 1 and 2.

TABLE 1

Transformation Examples:

| Adaptation | Enhanced Primary | G.711 PCM | To/From To/From | G.723 IP |
|---|---|---|---|---|
| Proxy Client | Enhanced Primary | PSTN Voice PCM | To/From To/From | IP Voice IP |
| Conditioning-Signal | Enhanced | ISUP | To/From | BISUP |
| Transport | Primary | TDM | To/From | ATM |

TABLE 2

Brokerage Examples:

| Network Layer | Broker Type | Service Element | Policy Element | Translation From | To |
|---|---|---|---|---|---|
| Enhanced | Service | VPN | Cost | Enhanced Layer Primitives | Enhanced Services |
| Primary | Resource | QoS | Cost | Primary Layer Primitives | Primary Services |

Types of Brokers

Figure 10:
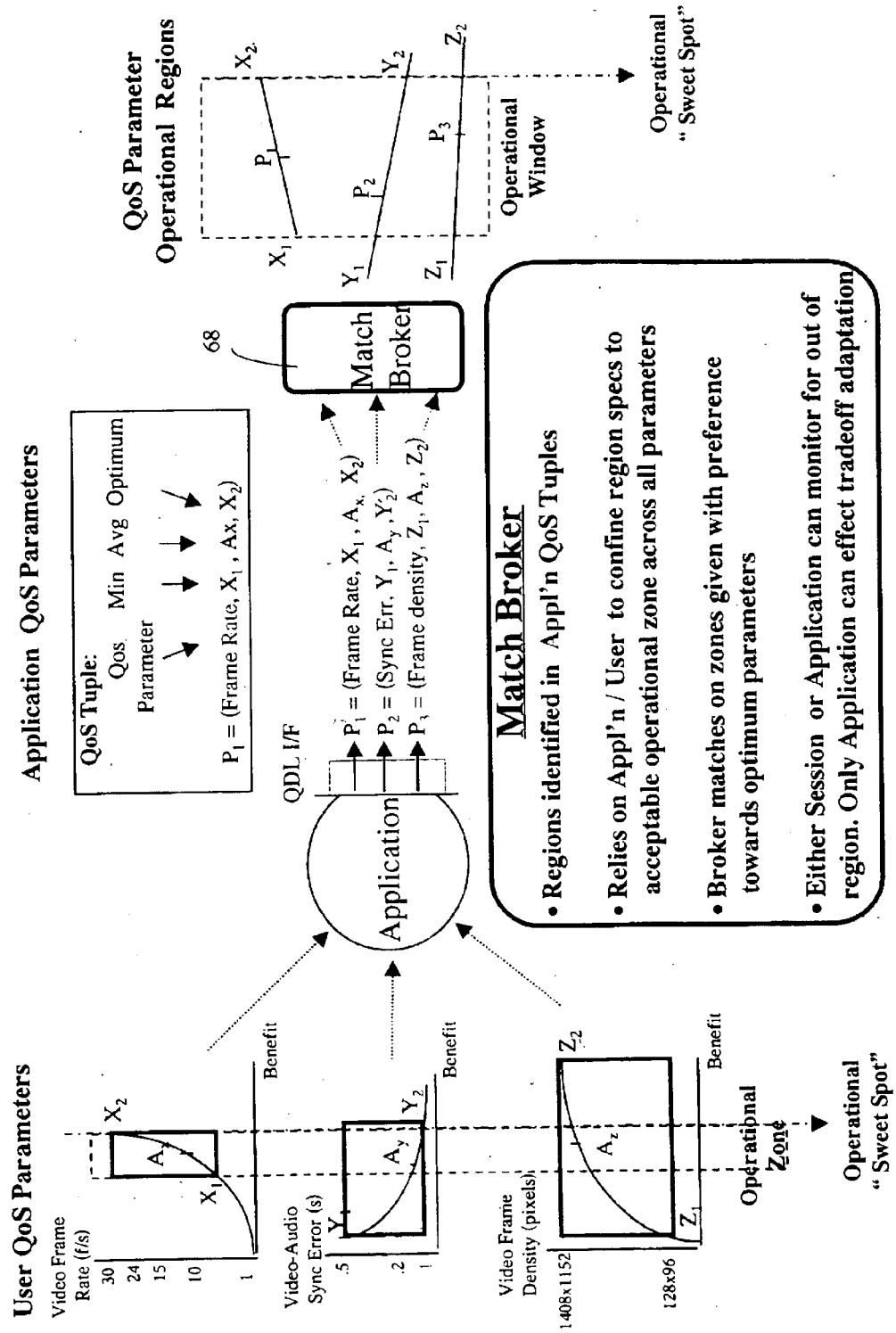
FIG. 10 is a schematic diagram illustrating exemplary functioning of a matching broker in the service capable network.

FIG. 10 illustrates the method of operation of a match broker 68. A match broker 68 can be constructed to either return service provider matches on single point arguments for each of the submitted primitives 22, 24, or, alternatively, the match broker can return offers matching a range of arguments specified in the primitives 22, 24 for further screening and selection by the user or the user application. No negotiation with the network on the offers returned is undertaken.

Figure 11:
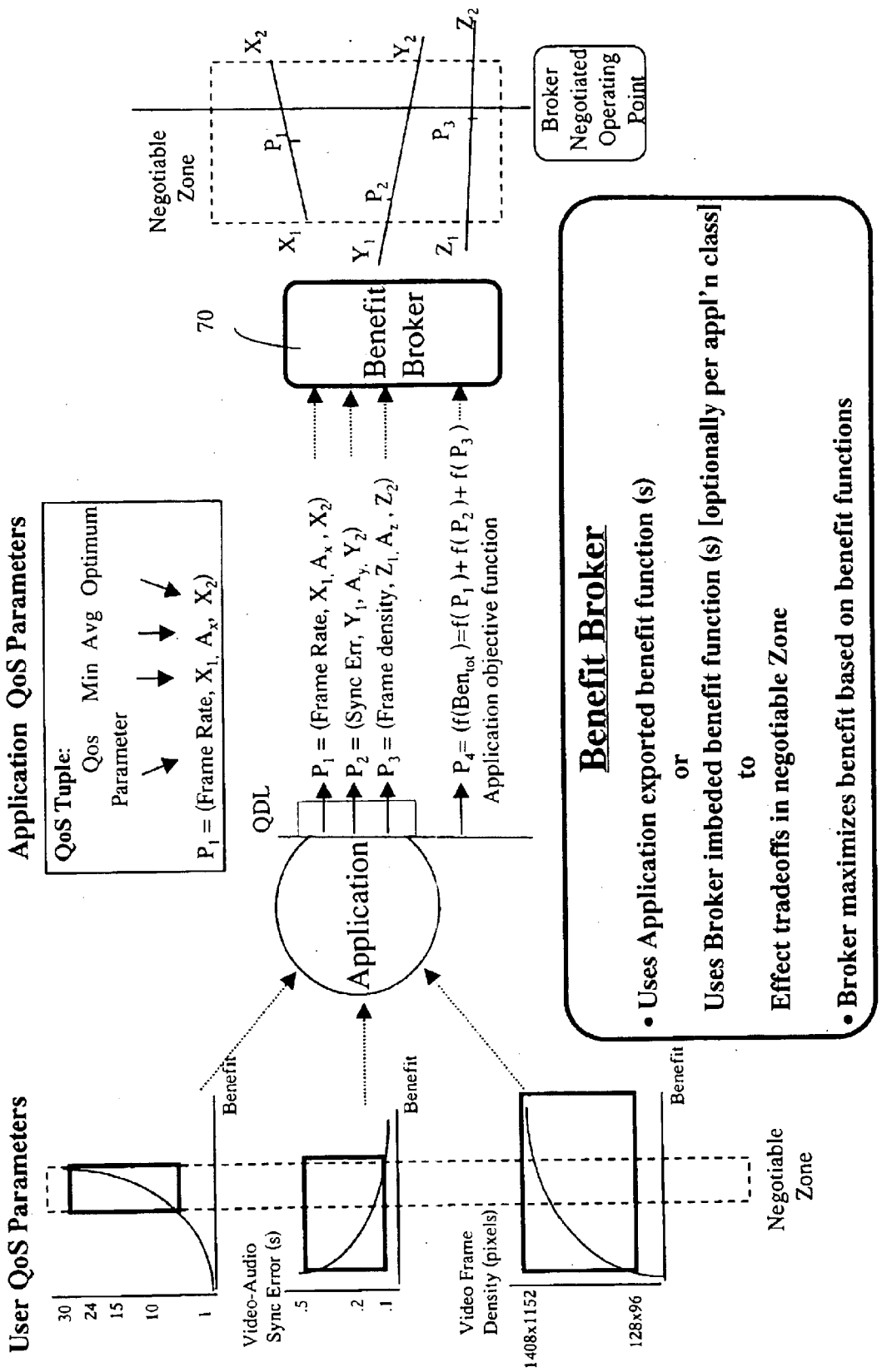
FIG. 11 is a schematic diagram illustrating exemplary functioning of a negotiating broker used in the service capable network.

FIG. 11 illustrates the method of operation of a negotiating broker, also referred to as a "benefit broker" 70. A negotiating broker 70 can be constructed to negotiate for a match over an argument range for submitted primitives 22, 24. Potentially, negotiations and their logical conclusion will be done with some knowledge of the allowable tradeoffs between the ranges of submitted Primitive arguments. The allowable tradeoffs can be submitted to the network by the end user or user application as arguments in a Benefit Primitive defining the tradeoffs that can be made.

The differences between these two types of brokers 68, 70 can be expressed as follows: A matching broker 68 searches for a "best-fit" based on fixed or deterministic rules while a negotiating broker 70 determines a "best-fit" based on discovered, non-deterministic external environmental conditions. Both the matching broker 68 and negotiating broker 70 are interactive with the end-user, application or user agent.

Another, more intelligent class of broker, is a resolving broker (not illustrated). A resolving broker is adapted to recognize individual end user preferences and overall user goals for communications and either evaluate a probable best offer within a set of offered capabilities or determine a probable best assembly of end-to-end services and connections. The resolving broker provides considerably more capability and value to both matching or negotiation functions.

As stated, the primary role of the matching broker 68 is to accept user service request inputs (as Communications Primitives, sent directly from the user or via an application or user agent) and to search through the attributes of services posted by service providers to and a match. The scope of the search (search algorithms and results filtering) is determined by both user and provider policies. The broker 68, 70 may then respond to the user in a number of ways. The matching broker 68 algorithm is preferably implemented in one of the following ways:

The matching broker 68 may return a list of suppliers that have offers that exactly match user requests. The onus is then on the user to select an offer (perhaps by index number) for the network to proceed with, from the posted attributes, to establish a service session.

The matching broker 68 may return a list of offers that nearly match user requests. The onus is on the user to select a supplier that is acceptable out of the set of near matches.

The matching broker 68 may be programmed to automatically proceed to service session establishment either using one of the exactly or nearly matched offers.

The matching broker 68 may return a "no match found" result, meaning there is not a close enough match to be considered a workable option.

Some of the attributes that constitute Primitive arguments in service requests are user capabilities required and user desired policies. These are in turn matched against capabilities and policies of service provider offers. Note that the full set of capabilities and policies allows service providers to differentiate in many ways.

Figure 12:
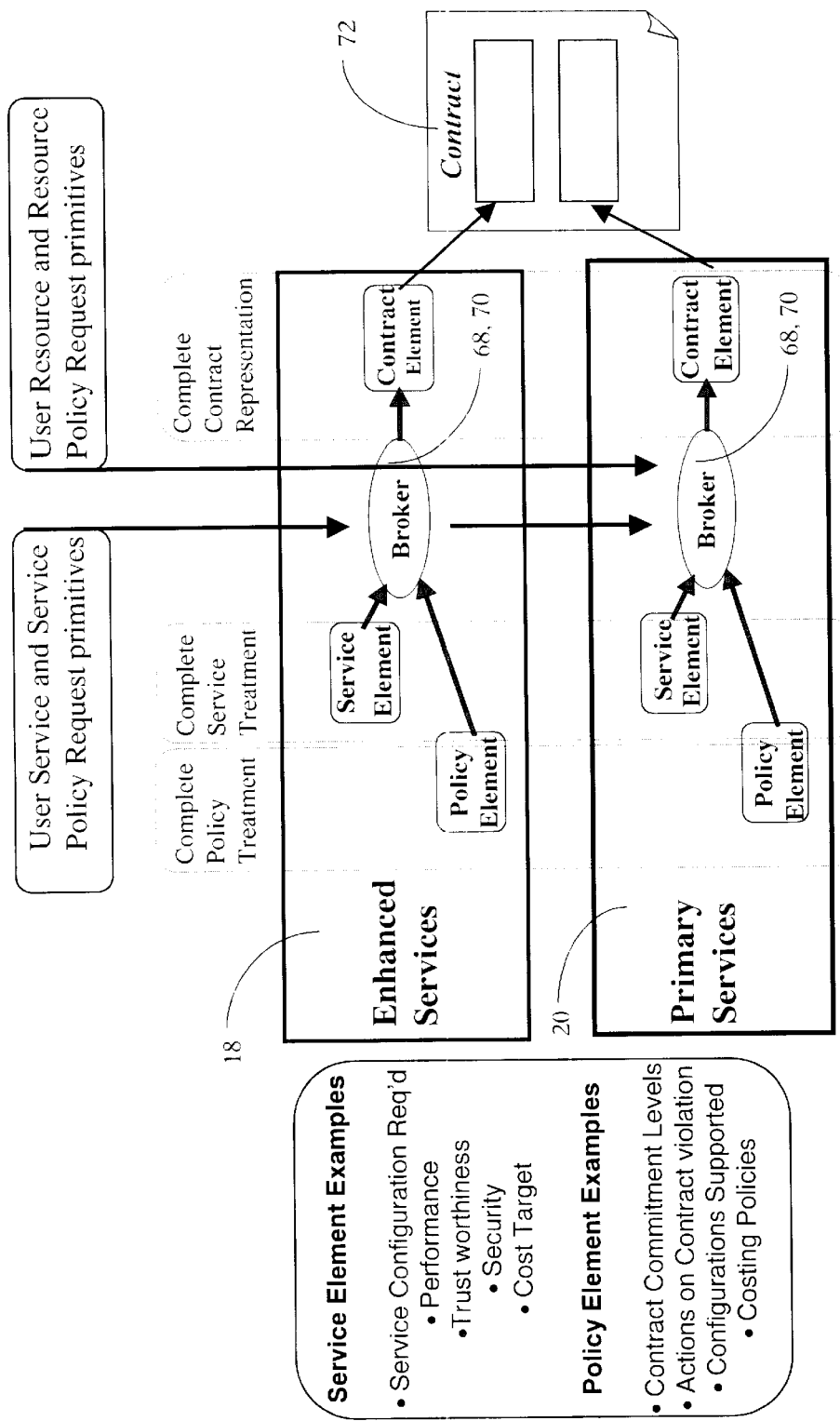
FIG. 12 is a schematic diagram illustrating the process of constructing an electronic contract in the service capable network.

If brokers fail to find a match, no services are initiated. FIG. 12 outlines how both service and policy elements are used by brokers in the enhanced and primary communications services layers to achieve a suitable service agreement.

Once the offer selections are made, the broker 68, 70 transfers control to session control for session creation and supervision. A session failure, for any reason, from which internal session recovery is impossible or is outside the terms of contract, may trigger a return to the broker 68, 70 so another service offer may be utilized.

Brokers are only instantiated (or activated) during the service establishment phase or when re-negotiation with a user or user agent becomes necessary. Otherwise, brokers 68, 70 are disconnected and dormant after session initiation and service supervision is left to service session control. If the service fails, the contract is violated or clients request mid session changes, brokers may be recalled as described above.

Electronic Contracts

With diversity of supply in communications services, users are beginning to demand that service level agreements and payment bound to performance, be dynamically negotiated. Current networks do not offer dynamic user-network contracting based on automatically optimized selection of communications services. The brokers 68, 70 in the SCN 10 select communications services which meet end-user or user agent requirements and capture service agreements in "electronic contracts" 72 (FIG. 12). The SCN 10 also uses the electronic contracts to automate network provisioning and maintenance.

Sections of Electronic Contracts 72 are completed by means of individual brokers 68, 70 which reside in the enhanced and primary communications services layers 18, 20. Electronic contracts 72 can be shared across peer network elements in the enhanced and primary communications services layers to achieve end-to-end service performance across multiple network providers. The complete electronic contract 72 includes all elements of Service and Policy agreements. Electronic contracts 72 represent the final point at which all details relating services and resources assigned to a user are known and, therefore, contain important relationship information not available at other points in the network. FIG. 12 illustrates how brokers 68, 70 populate service and policy agreements details into sections of the overall electronic contract 72.

The electronic contract 72 presented to the user by the customer facing service provider is the result of a series of subcontracts at each of the provider interfaces in the end-to-end delivery of a services or set of services. The electronic contracts 72 may be fixed or dynamic (i.e. negotiated). Each subcontracted service provider maintains a copy of his section of the contract and forwards a copy to the customer facing provider for inclusion in the composite contract.

Electronic contract details are data objects. The customer facing service provider is responsible for maintaining a data object that represents the total service contract with the subscriber. A set of communication primitives 18, 20 permit subscribers to Request, Confirm or get the Status of a contract. Further, the service provider can Notify the subscriber of changes in the contract. These operations provide the basis of a communication primitive subset specifically associated with electronic contracts 72.

Using open distributed processing techniques, the provider facing the subscriber can acquire all the posted subsections of an electronic contract 72 for accumulation into an overall contract object. OMG CORBA Open Distributed Processing provides capabilities of this nature. The same distributed processing model can be applied to the brokerage function itself to permit a broker 68, 70 to acquire service offers.

End-user invoices are created from data contained in the composite contract and from usage records produced by Service Session Control and maintained by Service Management. Individual subsections of the electronic contract 72 that relate to sub-contracted service providers form the basis of inter-provider settlements. A third party may also have access to the overall contract object in order to produce hard copy invoices (i.e. provide a billing service).

Communications Session Control

Before session control is described, an overview of a session is provided. It is well known that a session can be used to:

manage the end-to-end communication between users (e.g., a video conference call)

manage session associated logical resources such as are required for billing and various connection topologies (such as for multicast)

manage other resources that must be added into the network (e.g., translators,)

manage a number of diverse physical resources required for one "call" (e.g., ATM, IP, Wireless)

manage the physical resources of a particular transport (e.g., ATM).

The Session models used in the SCN 10 encompass each of these uses.

Figure 13:
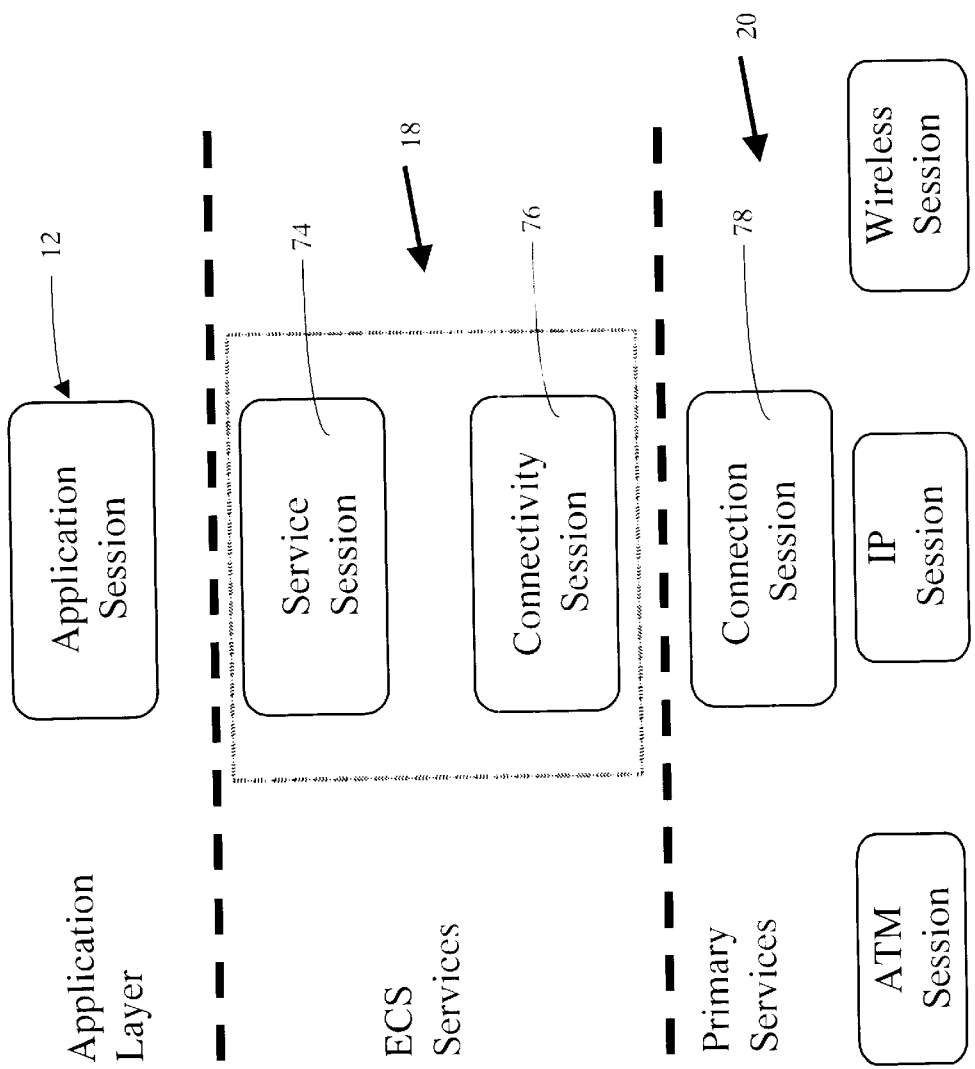
FIG. 13 illustrates the different types of sessions in a service capable network.

It is important to understand that there are several different types of sessions, each with different capabilities, each at different layers in the network. A clear separation of these sessions must be maintained if management of communications services is to be partitioned into manageable units. There are a number of different types of sessions and session managers included in the SCN 10. The SCN 10, however, disregards any session or session managers that reside in the Content or Application layer 12 (FIG. 1). FIG. 13 is a schematic diagram of the different types of sessions in the SCN 10. The enhanced services layer 18 contains two "logical" sessions namely a "service session" and a "connectivity session". The primary services layer 20 contains a connection session 78 that, in turn, supervises local network sessions belonging to individual service providers that contribute to an end-to-end communication path. In the SCN 10, the enhanced layer service session 74 is the ruling network based master that spawns a connectivity session 76, and in turn, a connection session 78.

The SCN 10 provides enhanced services that are available in the network to enable or augment user communications. An example of these is network edge adaptation capabilities. The enhanced layer service session 74 is used to manage these service capabilities.

Figure 14:
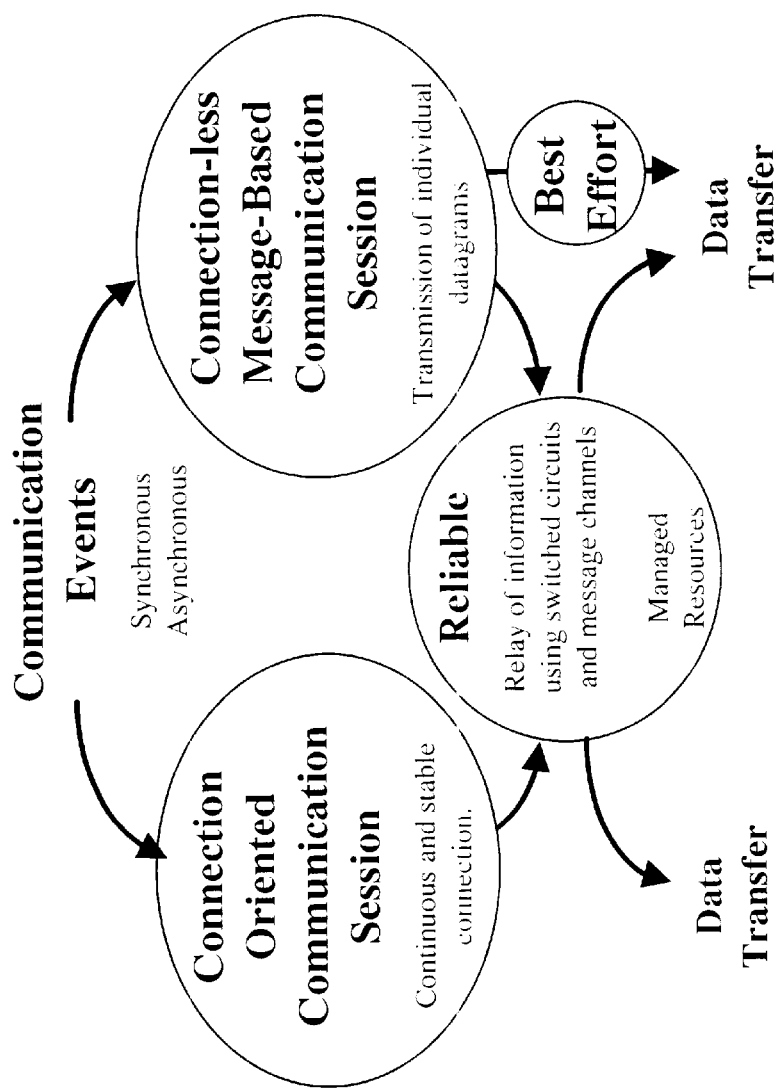
FIG. 14 illustrates the different forms of communications sessions used in the service capable network.

The SCN 10 also provides both connection-oriented and connectionless communication services. Connection oriented services are similar to those currently provided in Time Division Multiplex (TDM) telephony and Asynchronous Transfer Mode (ATM) networks. Connection-less services are currently found in message based systems such as Internet Protocol (IP) based networks using User Datagram Protocol (UDP). The SCN 10 includes the concept of a "minimal session" supervising associated services and billing for UDP/IP and TCP/IP based communications. FIG. 14 provides an overview of the two forms of connectivity sessions inherent in the SCN 10. The choice between using heavy-weight connection-oriented and light-weight connectionless session models is determined from primitives 22, 24 arguments (such as QoS, Cost & network availability).

The connectivity session 76, in the enhanced services layer 18 is the basis for connection management if multiple connection sessions 78 are used. In order for the SCN 10 to adequately support services that entail multiple participants, each exchanging multiple data streams in an application invocation, it is necessary for the network to support a connection topology more general than a point-to-point single channel connection. The term "session" is therefore used to mean an "n-way multi-channel connection set". It is important to recognize that, unlike the point-to-point single channel connection, the session is defined in such a way that a single session could be instantiated in any one of a variety of connection arrangements. This allows any number of participants to be accommodated in a session, and each can have any number of individual data streams to, or from, their terminal. Moreover, it is not required that each participant have the same data streams transmitted and received at their terminals. For example, on a combined voice and video call, some participants may not be capable of transmitting/receiving video, and hence they participate only in the voice portion of the call. The session in the SCN 10 is therefore a generalized connection concept, capable of representing an unlimited variety of connection topologies.

In each case, a session is used in conjunction with one or more end user applications running either in the end user's terminal or in a network element, or both.

In this view, the Service Session 74 manages the services and resources provided by the network. One such service is communications paths. The Connectivity Session 76, manages these paths and is used by end-user applications or other enhanced services layer functions to fulfill their connection management requirements. Both service session 74 and connectivity session 76 control logic reside in Connectivity Servers of the SCN 10.

Figure 15:
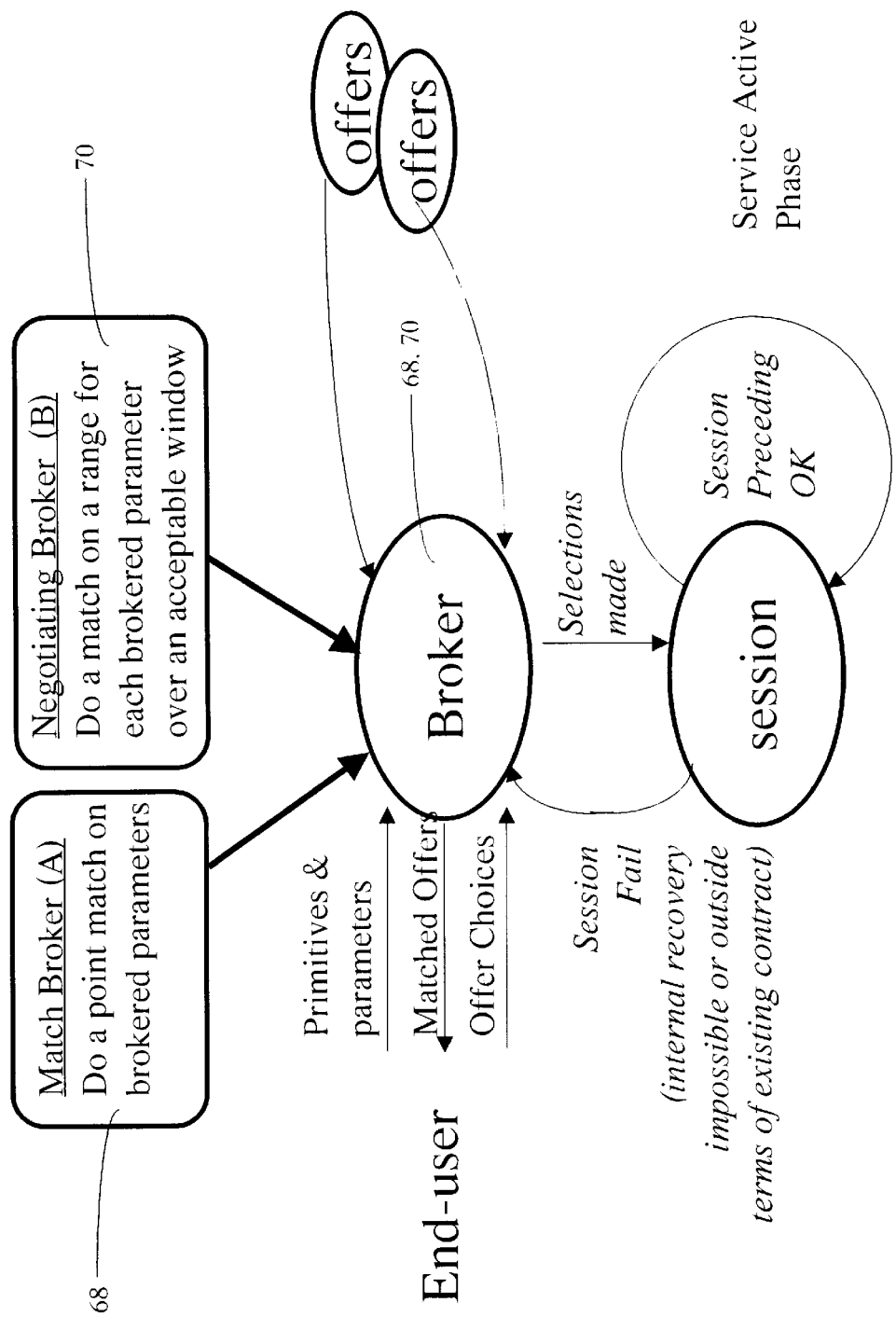
FIG. 15 illustrates the standard model for broker behaviour in the service capable network.

After service offer selections are made, the broker 68, 70 transfers control to Session Control for session creation and supervision. A session failure, for any reason, from which internal session recovery is impossible or outside the terms of contract, may trigger a return to the broker as described above so another service offer may be utilized. FIG. 15 illustrates the common broker session behaviour model assumed by all SCN 10 brokers 68, 70.

An exception to the common broker mode of operation described herein may be found in the low-level resource brokers in the Primary Services/transport layer. These brokers are not brokers that find offers to satisfy user requirements. Rather, these brokers acquire distributed resources to provide transport and are not visible to the user. They are not described in this application.

Directory Services and Profiles

Figure 16:
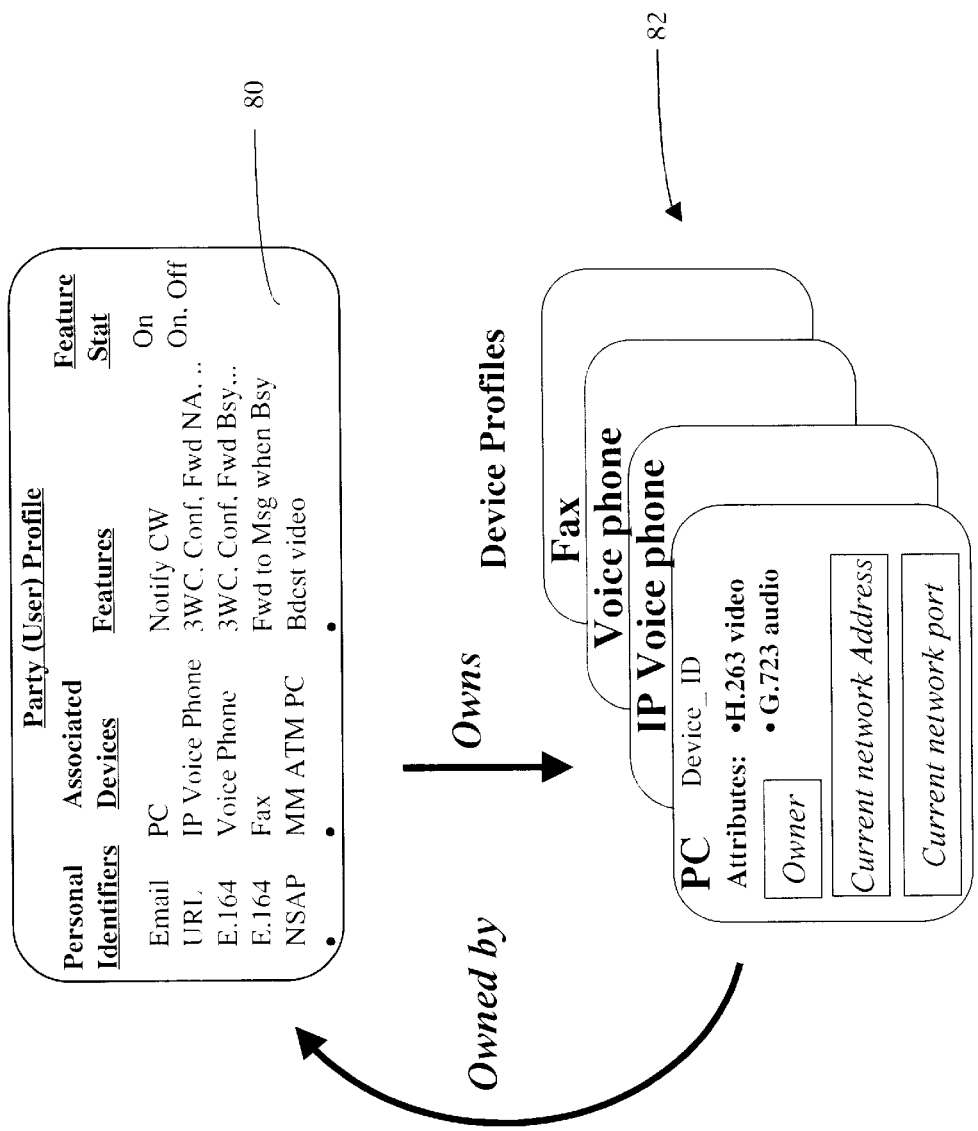
FIG. 16 illustrates an example of user profiles and device profiles used for routing in the service capable network.

Both Terminal and User Mobility is enabled in the SCN 10 through the use of party (or user) profiles 80 and device profiles 82, shown in FIG. 16. These profiles 80, 82 are S/W data Objects which identify Users and Devices, as well as describe their characteristics or attributes.

The two sets of profiles 80, 82 are inter-linked. A user may own several communications devices. The associated device types and device numbers are listed in a user profile 80 and serve as pointers to the user's device profiles 82. The device profiles 82, in turn, have an ownership attribute that identifies the user owning the device. A device may have more than one owner. This attribute serves as a return pointer back to the user profile 80.

The user profile 80 contains a series of personal identifiers that may consist of Email addresses, Universal Resource locators (URLs), telephone numbers (E.164 addresses), Private Network Addresses (e.g. NSAP's) and other similar tags assigned to a user. The user profile 80 may also contain many additional pieces of information that can include, but are not limited to, features or services subscribed to, feature activation status, etc.

Device profiles 82 include both device attributes and pointers to the network port where the device is currently attached. The port may be relatively fixed, such as for wired terminals or may be transient, such as for wireless terminals. The SCN 10 assumes any device can be transiently attached to any port. The device may also be contacted through a more permanent "logical" address. (For example, behind most portable 800 series telephone numbers is a fixed network telephone number. In some cases the address and the telephone number are one in the same.)

Figure 17:
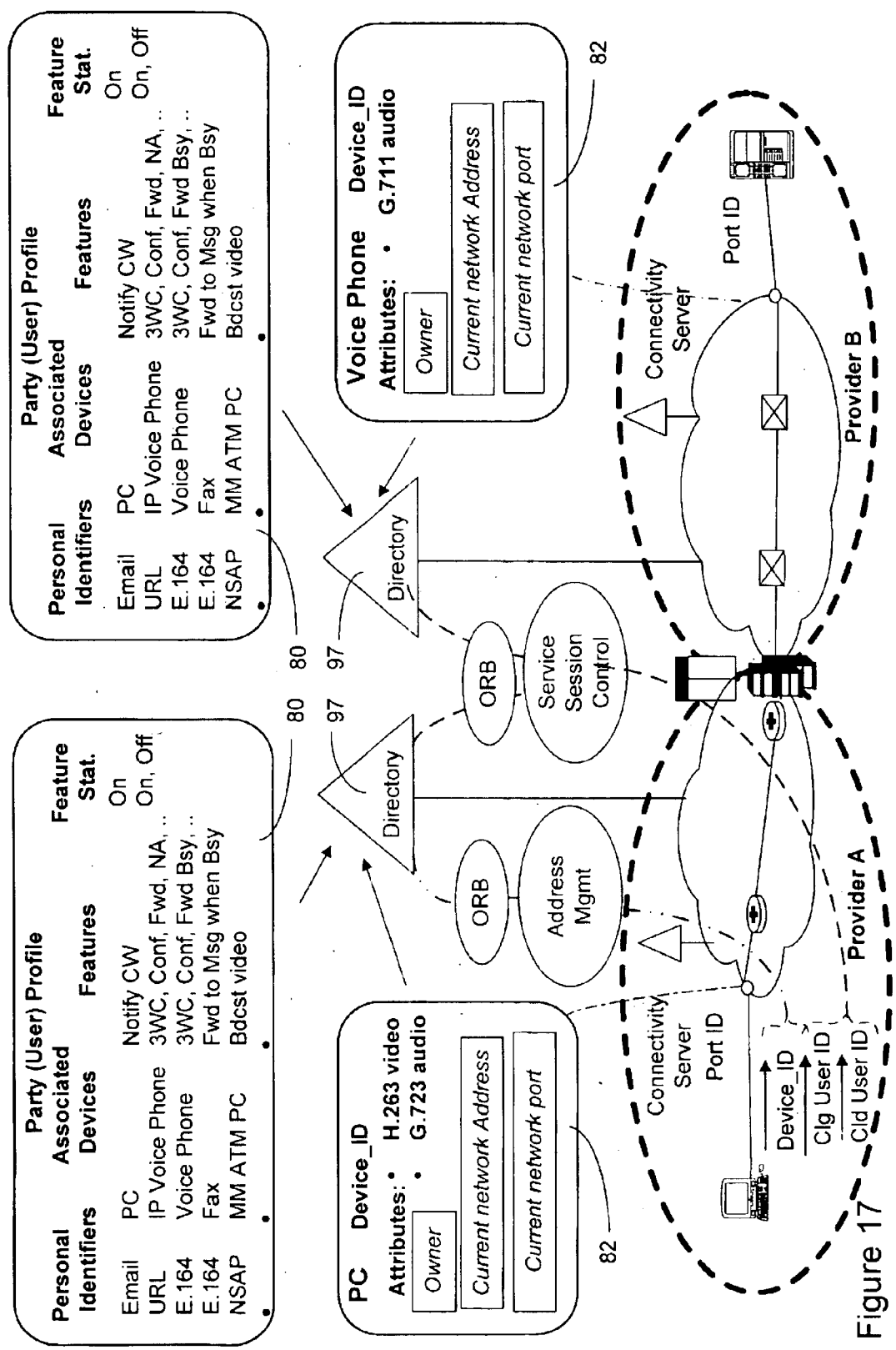
FIG. 17 is a schematic diagram illustrating the use of directories and profiles in the service capable network.

FIG. 17 provides an example of the use of Directories and Profiles to enable both wireless and wire-line mobility in the Service Capable Network.

From the user profiles 80 and device profiles 82, service session control can match user capabilities and preferences to effect goal oriented communications. Party and device profiles associated with each user permit service session control to configure a goal oriented, workable communication arrangement between the various interacting parties. It is important to note that party profiles 80 can be created for logical entities in addition to real people. User agents, for example, can have party profiles 80. The SCN 10, therefore, provides for future implementation of Mobile S/W Agents that may roam the network doing tasks on a user's behalf. Such agents will have logical "docking" ports in the network that can be treated in the same manner as real, physical ports to permit the receipt and transfer of messages.

Exemplary Call Walk-through

FIG. 18 illustrates the network topology used for a multimedia call-walk-through in the SCN 10.

Figure 19A:
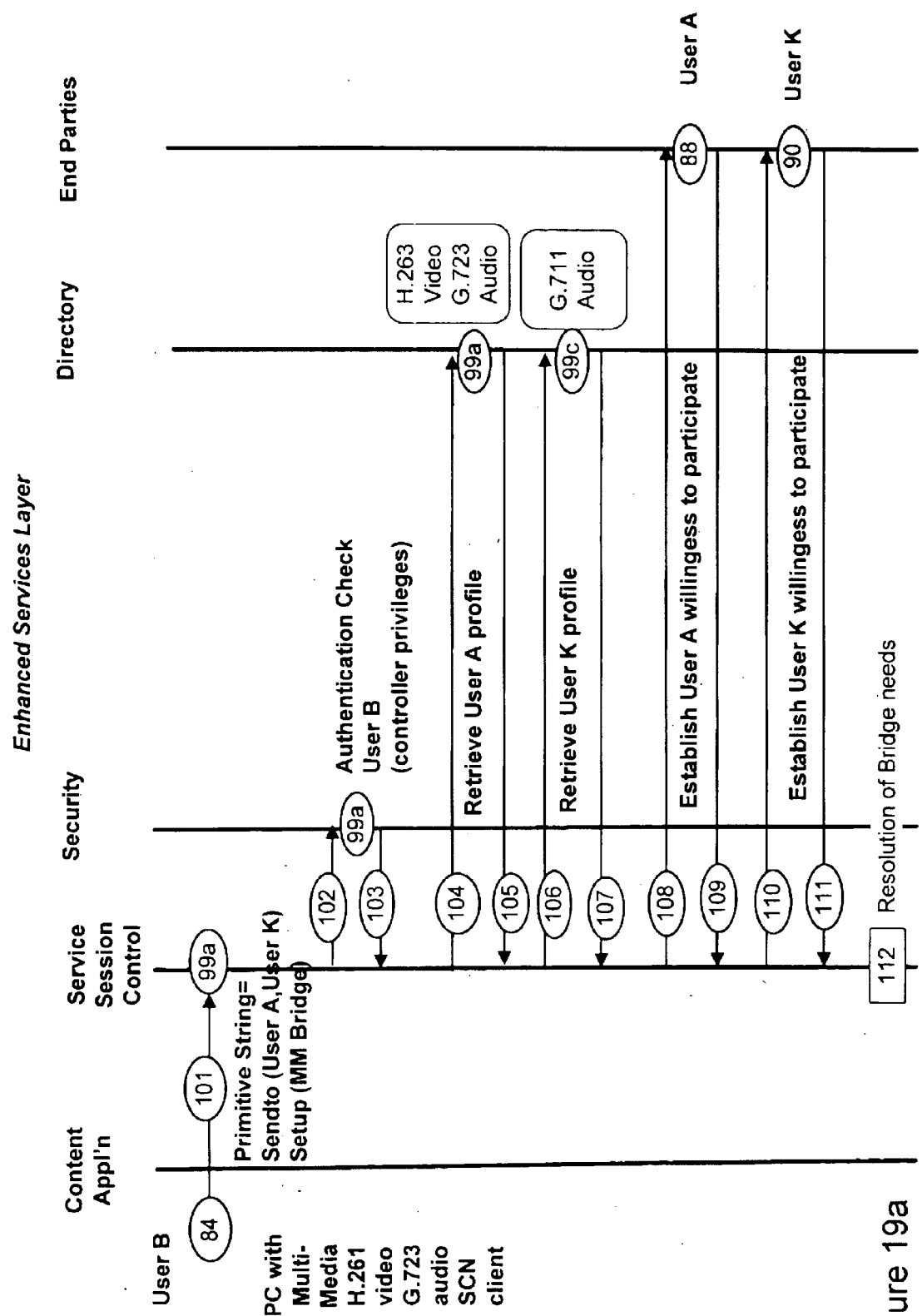

A user at a Multimedia PC 84 running a multimedia conferencing application wishes to access the SCN 10 to set up a conference. The multimedia PC 84 has an SCN "thin" broker client 86 that provides APIs for accessing both the enhanced services and primary services layer of the SCN 10. Content applications (such as the multimedia conferencing application) utilize enhanced and a primary communications primitives 22, 24 to interface to the SCN 10 through brokers in each layer. The primitive strings shown in FIG. 19a are enhanced layer primitives 22 while those shown in FIG. 19d are primary layer primitives 24. The user at multimedia PC 84 wishes to communicate with a first user 88 in the same (IP) network and a second user 90 in another (TDM) network via an intermediate (ATM) network that also provides a multimedia bridge service 92. User's multimedia PC 84 is capable of video conferencing, using the H.261 standard, and audio conferencing using G.723 standard. The first user's PC 88 is capable of H.261 video and G.723 audio. User 90 has a standard voice phone that adheres to the G.711 standard, which is served by a legacy telephone switch in the TDM network. The legacy network interfaces the SCN 10 compatible ATM network through a Network Access Point (NAP) 94. The NAP 94 provides a SCN proxy client 64 for the voice phone. The proxy client 64, in NAP 94, is capable of cleanly separating voice content, and telephone set signaling, from transport so that information at the transport level need not be need not be examined within the SCN 10. In addition, the proxy client 64 is capable of mapping the telephone set signals into primitives 22, 24 to utilize some of the enhanced capabilities of the SCN 10. (Use of broker-related primitives by the proxy client 64 takes place if the telephone set were the originator of the conference, but since the telephone set is in a receiver in this example, the use of primitives by that terminal is not described.) The clean separation of transport and content in SCN 10 means that legacy terminal signaling must be "conditioned" or mapped into SCN 10 control signals in the proxy client 64. CCS7 has been assumed as the control signaling in this example. Other, newly developed control signaling protocols are being developed, in particular for broker-network interaction and for other signaling as well. A broker signaling converter may be devised to utilize CCS7 (or other currently used, transport de-coupled signaling protocol).

In this particular example, the multimedia bridge service 92 provided in the ATM network, is used to establish the multimedia conference. The bridge service 92 could be provided by either the collector network 96 operator or a 3rd party) . This multimedia bridge 92, acquired through the enhanced layer Service broker, provides bridging for H.261 video and G.711 audio. Because the two PCs 84, 88 in the IP Site network utilize G.723 highly compressed audio, the Network Access Point 94 must be called upon to apply adapters to voice connections between both IP network PCs and the multimedia bridge 92 so that the PC's can make use of the multimedia bridge 92.

Adaptation service is an edge service that the user may request through primitives. However, the required attributes of both the multimedia bridge 92, and the adapters can be deduced by Session Service Control by examining the user and device profiles stored in Service Provider directories. Adapters are required in this walk-through because the multimedia bridge 92 actually acquired by the enhanced services broker does not exactly match the attributes desired.

Network gateways 98 provide the necessary "conditioning" in both the enhanced and primary services layers 18, 20 to permit networks consisting of different technologies to couple. At the enhanced layer gateways 98 provide the necessary transport independent signaling conversions and, at the primary layer gateways 98 provide transport protocol conversions (IP<->ATM, ATM<->TDM).

Brokers services software (not broker clients) reside on the NAPs 94a,b and acquire service provider service offers posted on the NAPs 94a,b. Normally NAPs 94a,b are not required between two SCNs because all information movement through the two networks has clear Content-Transport layer separation. Transformation is provided at SCN 10 edges to permit interfacing with other SCN incompatible networks. Gateways 98 are always required between any two incompatible networks.

In future, networks will have network-wide enhanced and primary layer control logic centered in connectivity servers 99a–c that are divorced from actual transport nodes. Only tightly coupled path logic will be found in nodes. This separation applies to NAPs 94a,b and gateways as well as nodes. Thus, in this walk-through, most of the control logic resides in the connectivity servers 99a–c. Connection control logic for edge-to-edge paths across a single Provider domain is preferably also in the connectivity servers 99a–c.

The walk-through assumes that, in the SCN 10 IP site network, the broker is in NAP 94a while only the broker client 86 is in the multimedia PC 84. It is also possible to locate both the broker and broker client in an SCN compatible PC. The PC, in effect, contains an NAP 94.

The example walk-through focuses on connection oriented bearer communications paths. Their session infrastructure is utilized in the walk-through. As described above, the SCN 10 also accommodates connectionless, message-oriented paths and associated "sessions", but such connections are not described by way of example. They too make use of primitives but usually do not require a proxy client 64, because content and transport are already cleanly separated. In addition, paths established to carry signals themselves, e.g. broker or network control signals, exist but have not been described or illustrated. Their setup is well understood by persons skilled in the art.

The walk-through uses a centralized session control model (like a SCP), therefore most of the session control is in one Connectivity Server 99a. A highly distributed version can be developed which distributes session control and session logic to a greater extent across connectivity servers 99a, b and c.

Figure 19B:
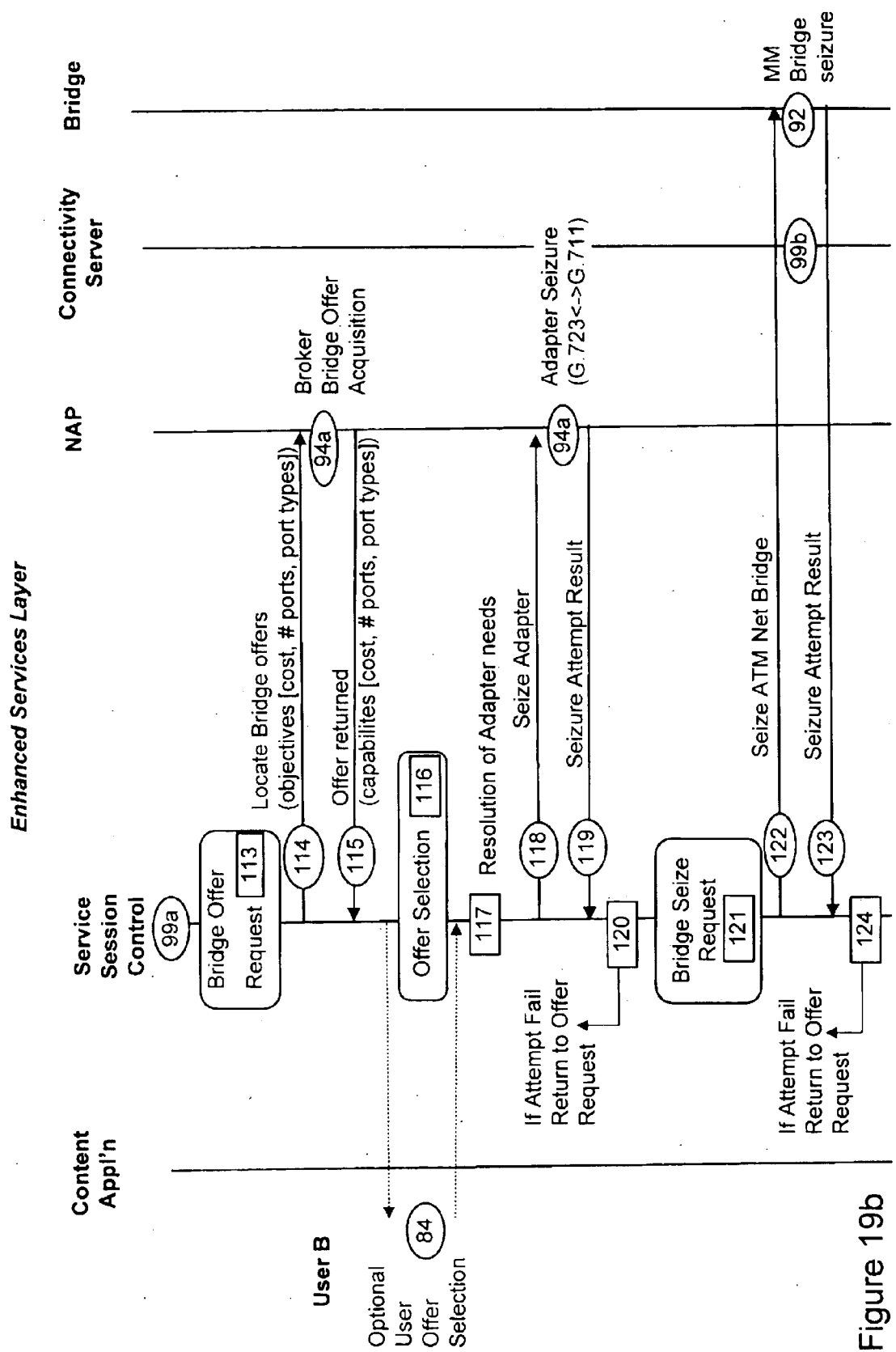
Figure 19C:
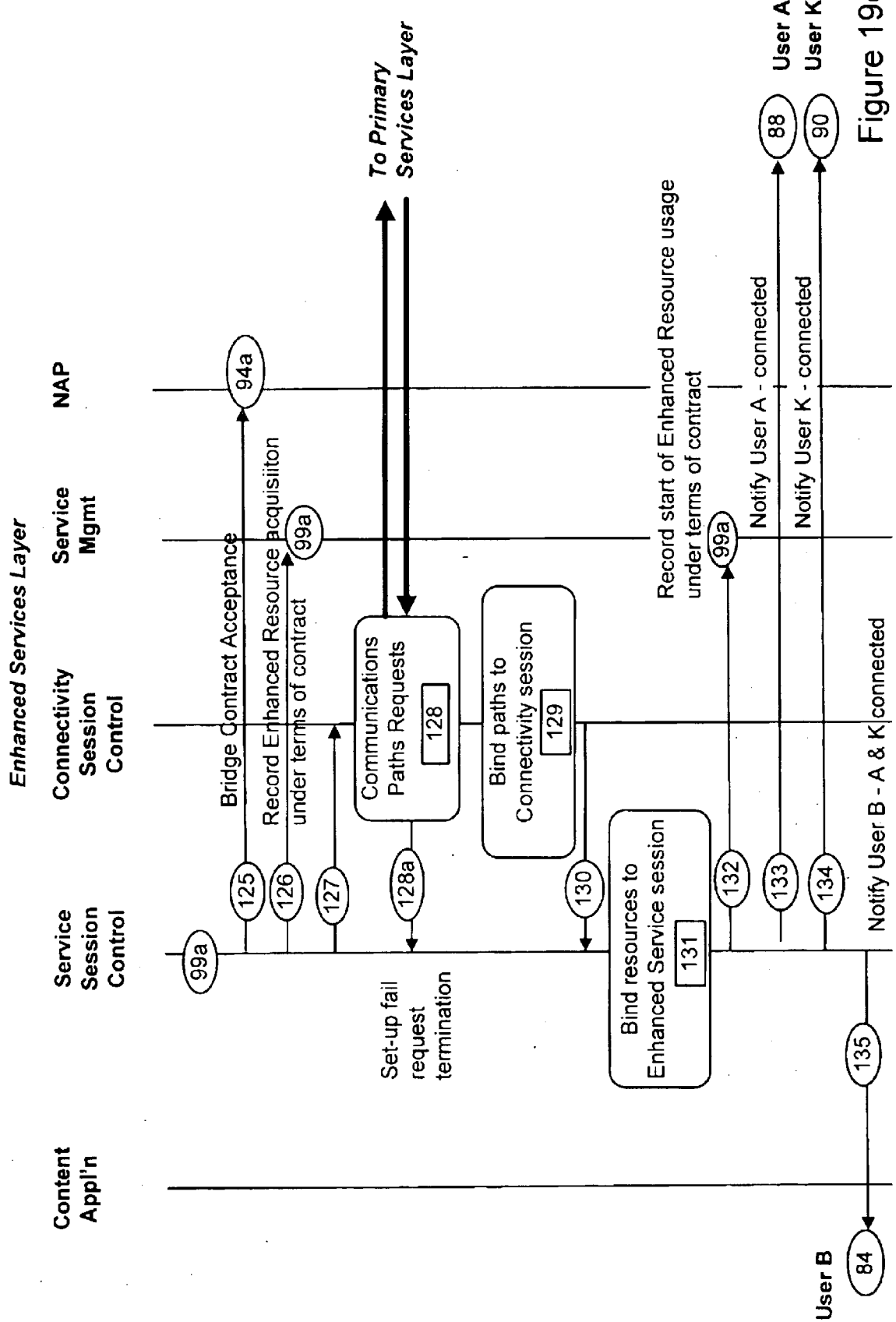

FIGS. 19a to 19c portray the sequence of events that take place in the enhanced services layer 18 during the multimedia conference setup phase.

The steps in this process are as follows:

101. A Content Application [multimedia conferencing] on multimedia PC 84 sends a session establishment request as a string of primitives containing associated attributes or parameters. The primitive string shown in FIG. 19a is a subset of Primitives 22 defined for SCN 10. Further, only enhanced communication primitives 22 used for enhanced services activation are shown. Primary communication primitives 24 are shown in FIG. 19f. Service session control has previously received profile for the user of multimedia PC 84 (data not shown) from the Directory 97 (FIG. 17) and is aware of the user's communications requirements and capabilities.

102. Service Session Control in Connectivity Server 99a identifies user multimedia PC 84 and queries a Security Server (not shown) for data on the user of multimedia PC 84.

103. The Security Server [assumed to be part of Connectivity Server 99a] performs an authorization and authentication check on the user of multimedia PC 84. Multimedia PC 84 is authorized to set up multimedia conferences and to act as the conference controller. [Security could be on another server e.g. Directory Server 97 (FIG. 17)]. The Security Server returns the results the user passes authentication and authorization.

104. Session Service Control requests called the first user profile 88 from the Directory Server 97. The directory server 97 extracts the profile 80 [which indicates that the first user 88 has H.263 Video and G.723 Audio capability] and packages the result for transmission to Service Session Control.

Directory server 97 sends the profile to Service Session Control.

105. Service Session Control requests the called second user 90 profile 80 from the Directory Server 97.

106. The Directory server 97 extracts the profile 80 [which indicates that the second user 90 has G.711 Audio capability] and packages the result for transmission to Service Session Control.

107. The directory server 97 sends the profile to Service Session Control.

108. Service Session Control sends a message to the first user 88 to determine if they will participate in the conference.

109. The first user 90 returns a message indicating willingness.

110. Service Session Control sends a message to the second user 90 to determine if they will also participate in conference.

111. The second user 90 returns a message indicating willingness.

112. From the three profiles [84, 88 and 90], Service Session Control determines that a multimedia bridge with two H.263 ports, two G723 ports and one G711 port is required.

113. Service Session Control formulates a multimedia bridge request for two H.263 ports, two G.723 ports and one G.711 port and forwards it to the broker on NAP 94a. The request contains the user submitted primitive attributes that represent contract cost objectives. [Note: H.261 & H.263 can inter-work with QCIF format].

114. The Service Session Controller forwards the bridge request to the broker located on NAP 94a.

115. The broker scans bridge service offers posted in all accessible NAPs and returns the nearest matched offers to the Service Session Controller in connectivity server 99a.

116. The service Session controller can either forward the nearest set of matches to the user for selection of a Bridge, perhaps based on condition of cost, or can automatically select the nearest match.

117. After the bridge selection has been made Service Session Control finds that the bridge is not an exact match so Service Session Control determines what adapters are required to make communication possible with the selected bridge and formulates an adapter seize request. The system's automatic determination capability is used to simplify communications for the user].

118. Service Session Controller forwards a G.723<->G.711 Adapter seize message to the local, NAP 94a.

119. The NAP 94a seizes the adapter and notifies Service Session Controller of its ports.

120. If adapter seizure fails the Service Session Control returns to the bridge offer request in case the user (or system) wants to make an alternative bridge selection.

121. If the adapter is successfully seized, Service Session Control formulates a bridge seize request for the selected bridge.

122. Service Session Control forwards the seize request to the connectivity server 99b controlling the bridge which then accesses and seizes the bridge 92.

123. The connectivity server 99b returns the seize result including the port #'s and types to Service Session Control.

124. If the seize attempt failed, Service Session Control would return to the bridge offer request point to allow reselection.

125. If the Bridge seizure was successful Service Session Control notifies the NAP 94a that presented the chosen Bridge offer that the Contract was acceptable.

126. Service Session control also sends a message to Service Management indicating the contract was accepted and that acquisition of enhanced resources [bridge and adapter] should be recorded and added to the service invoice.

127. Service Session Control can now proceed to acquire and attach the necessary communication path resources. Service Session control forwards a request including a list of all the ports needed to be connected to Connectivity Session Control, also in connectivity server 99a. Connection descriptions include end user port addresses [from profiles] and auxiliary component ports (i.e. the bridge [in ATM collector network 96] and adapters [in NAP 94a]. Connection requirements are forwarded with the ports and include primary services primitive attributes including cost objectives, QoS Security Level, and Interactivity required [FDX, HDX, Broadcast, Unicast, Multicast etc.].

128. Connectivity Session Control formulates a series of communication paths requests to be forwarded to the primary services layer 20 [activities described in FIG. 19f]. The primary services layer 20 returns details about the paths selected. These details include a list of the connections established, including those made through selected network gateways 98 and enhanced service auxiliary components.

128a. If the primary services layer fails to establish connections, Services Session Control is directed to go to its termination phase.

129. The returned primary services resources (communications paths) are bound to the connectivity session.

130. A list of primary services resources and their attributes is forwarded to Service Session Control in connectivity server 99a.

131. All resources used in both the enhanced and primary services layers 18, 20 are now bound into the overall enhanced service session.

132. Service Session Control now sends a message to service management in connectivity server 99a indicating that enhanced resource usage has started under the terms of the brokered electronic contract 72.

133. User 88 is notified that his connections have been established.

134. User 90 is notified that his connections have been established.

135. Origination user at multimedia PC 84 is notified that users 88 and 90 are connected.

FIG. 19d (including items 136–142) indicates the behaviour of some of the major functional components during the conference active phase.

Figure 19E:
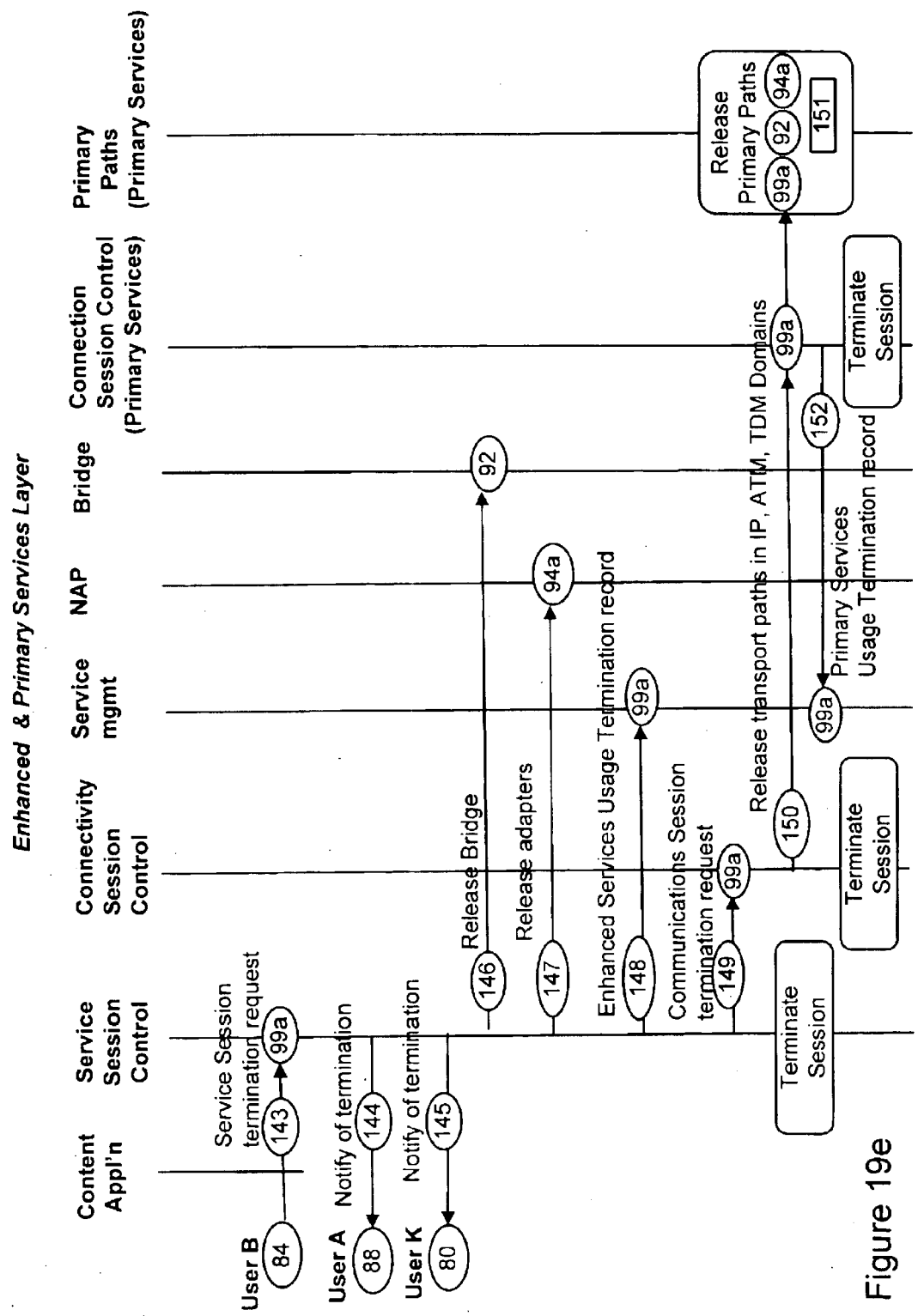
Figure 19F:
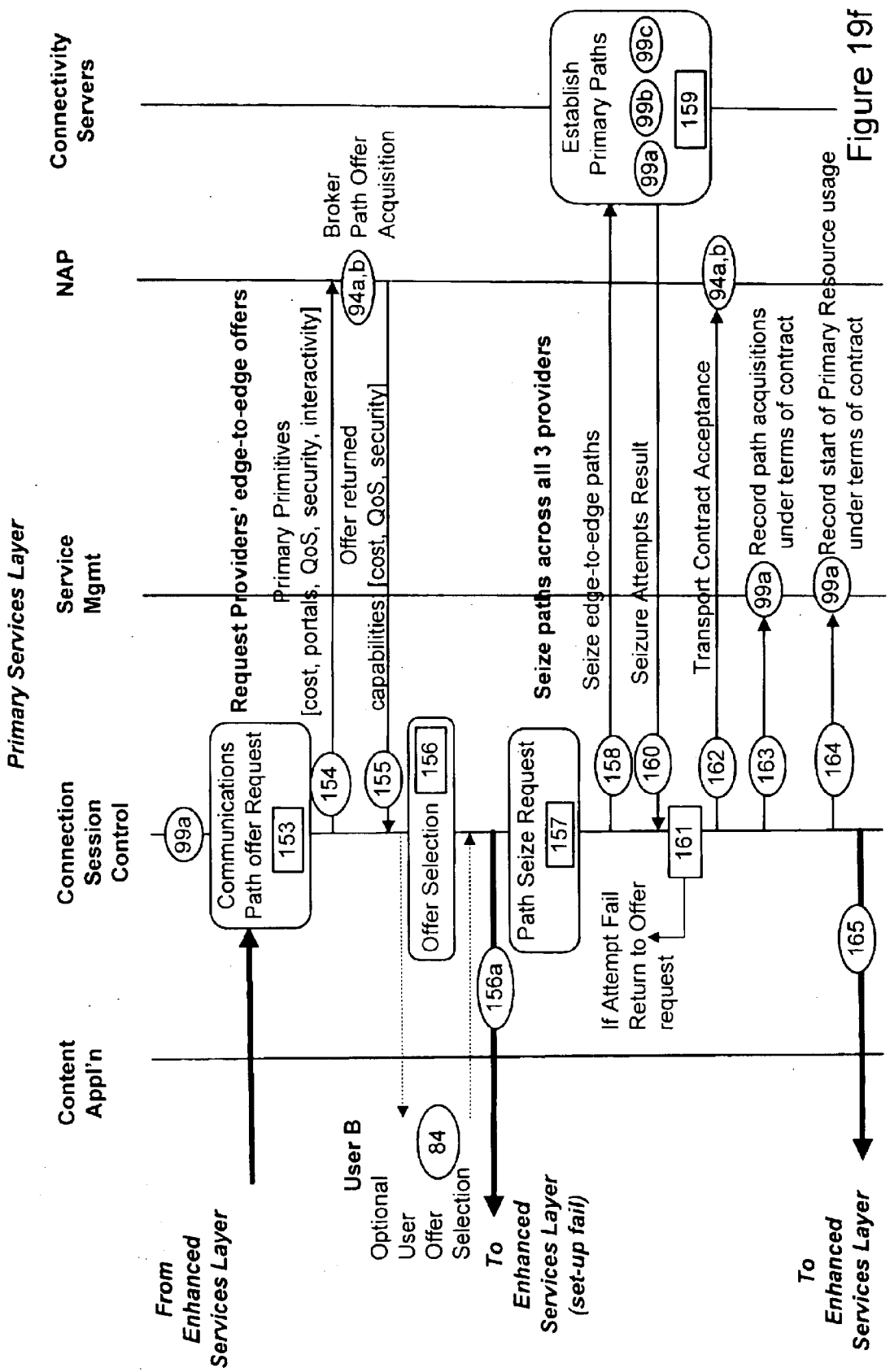

FIG. 19e portrays the sequence of events that take place in the Enhanced Services layer during the multimedia conference takedown phase.

The steps in this process are as follows:

143. User at multimedia PC 84 terminates the conference.

User 84 signals termination of the multimedia conference to Service Session Control in connectivity server 99a either by exiting the application window or by generating appropriate primitives.

144. Service Session Control sends a message to the first user 88 notifying of conference termination.

145. Service Session Control sends a message to the second user 90 notifying of conference termination.

146. Service Session Control sends a release message to the connectivity server 99b that supervises the multimedia conference bridge 92. The connectivity server 99b, in turn, releases the bridge 92.

147. Service Session Control sends a message to the NAP 94a to release the adapter.

148. Service Session Control notifies service management to record service usage termination for billing purposes.

149. Service Session Control notifies connectivity session control of the conference termination then terminates the service session.

150. Enhanced Layer Connectivity Session Control forwards a request to Primary Layer Connection Session Control to release all transport paths and associated resources then terminates the connectivity session.

151. Primary Services Path Controllers release primary paths/connections under their jurisdiction.

152. Primary Layer Connection Session Control forwards a message to service management indicating the end of usage of primary services for billing purposes then terminates the connection session.

FIG. 19f portrays the sequence of events that take place in the primary services layer during the multimedia conference setup phase.

153. Primary Layer Connection Session Control receives connection descriptions including end user port addresses [from profiles 80] Service Auxiliary component port addresses [for the bridge 92 in the ATM collector network 96 and the adapter in NAP 94a]. Connection attributes forwarded include the primary communications primitives 24 and parameters associated with communications path cost objectives, QoS, Security Level, and Interactivity [i.e. FDX, HDX, Broadcast, Unicast, Multicast etc.]. Connection Session Control formulates Path offer requests.

154. Path offer requests are forwarded to the connection brokers on NAPs 94a and 94b serving the networks where end-user, service auxiliary and gateway ports reside.

155. Path offers are returned by each of the brokers.

The offers include the attributes of selected paths. [Cost, QoS, Security, etc.]

156. Path offers may be forwarded to user, user agent or application for offer selection or the brokers may alternatively select offers for use by Connection Session Control.

156a. If no valid offers remain, or all offers have been attempted, or the user requests abandon, the primary services layer returns a service session termination request to the enhanced services layer.

157. Connection Session Control formulates Path Seize requests for selected offers.

158. Connection Session Control forwards edge-to-edge path seize requests to connectivity servers 99a, 99b and 99c in each network domain.

159. Local connectivity servers 99a–c attempt to establish connections.

160. Local connectivity servers 99a–c respond with seizure attempt results.

161. If seizure attempts fail, Connection Session Control returns to the path offer request point.

162. Connection Session Control forwards a primary services contract acceptance message to NAPs 94a and 94b.

163. Connection Session Control notifies service management of path acquisitions under the terms of contract.

164. Connection Session Control requests recordal of the start of primary resource usage.

165. Connection Session Control notifies connectivity session control in the enhanced services layer [in connectivity server 99a] that the communication path request is complete.

FIG. 20 is a table showing the connections, adaptations, bridges and conditioning conversions performed during the call walk-through described above. It should be understood that a network signaling protocol change between networks in the enhanced and/or primary communications services layers 18, 20 would normally require conditioning at intervening gateways 98. However, for the purposes of the call walk-through described above, Signaling System 7 has been assumed for both layers throughout so no signaling conditioning was required.

The embodiments of the invention described above are intended to be exemplary only. Changes and modifications will no doubt become apparent to those of skill in the art. The scope of the invention is therefore intended to be limited solely by the scope of the appended claims.

We claim:

1. A service capable communications network for enabling communications between sources and sinks, comprising:
   a first logical layer for providing network functions, the first logical layer being partitioned into multi-nodal services which may be accessed by users, user agents or adjoining networks using a first set of primitives that permit interaction with functionality of the first logical layer to initiate and control the multi-nodal services; and
   a second logical layer for providing node functions, the second logical layer being partitioned into nodal services that may be accessed by users, user agents, the first logical layer multi-nodal services or adjoining networks using a second set of primitives that permit interaction with functionality of the second logical layer to initiate and control communication paths and support transport functionality.

2. A service capable network as claimed in claim 1 wherein the first logical layer is partitioned into multi-nodal services that include transformation services, service management, directory services, communications control and brokerage services.

3. A service capable network as claimed in claim 2 wherein the brokerage services are performed by matching brokers and negotiating brokers that secure services for users and user agents.

4. A service capable network as claimed in claimed 3 wherein the matching and negotiating brokers complete predefined sections of an electronic contract which is presented to the user or the user agent after a communications session has been brokered.

5. A service capable network as claimed in claim 4 in the brokerage services in the second logical layer are performed by connection brokers that also complete predetermined sections of the electronic contract.

6. A service capable network as claimed 5 in claims wherein the electronic contract is presented to the user by a user-facing service provider.

7. A service capable network as claimed in claim 5 wherein if a communication session spans more than one service provider, each service provider in a path of the communications session retains a subsection of the electronic contract which relates to a portion of the communications session provided by that service provider.

8. A service capable network as claimed in claim 2 wherein the transformation services include:
   content adaptation which transforms the presentation, and transport aspects of encoded content format without requiring detailed knowledge of its meaning;
   conditioning to provide bi-directional conversions between representations when entering or leaving the network; and
   proxy clients to augment conditioning by creating communications primitives from content and connectivity information in order to enable brokerage services.

9. A service capable network as claimed in claim 2 wherein the management services use data retrieved from electronic contracts to compile network usage statistics used for network planning and provisioning.

10. A service capable network as claimed in claim 2 wherein the directory services include directory servers used to store user profiles and device profiles which may be retrieved to locate addresses associated with a user and addresses associated with devices owned by or used by the user in order to permit communications connections to be effected.

11. A service capable network as claimed in claim 2 wherein the communications control comprises session logic that operates to control a communications session through the service capable network.

12. A service capable network as claimed in claim 2 wherein the first logical layer is further partitioned into path independent functions and functions associated with a path.

13. A service capable network as claimed in claim 2 wherein the brokerage services comprise a broker that receives, from a user application or an adjacent network, primitives derived from the first set, the prinitives being associated with arguments that enable the broker to retrieve one or more posted service offerings that satisfy a service requirement of the user or the adjacent network communicated to the broker by the primitives.

14. A service capable network as claimed in claim 13 wherein the broker presents all service offerings to the user application or the adjacent network to permit the user or the adjacent network to select a preferred service offering from the service offerings that satisfy the service requirement.

15. A service capable network as claimed in claim 13 wherein the broker is enabled to autonomously select a one of the service offerings based on one or more predetermined criteria and to present the selected service offering to the user application or the adjacent network.

16. A service capable network as claimed in claim 13 wherein the adjacent network is represented by a second broker that passes the primitives to the broker in the service capable network.

17. A service capable network as claimed in claim 13 wherein the broker is a matching broker that selects service offerings by finding posted service offerings having attributes that match each of the arguments associated with the primitives.

18. A service capable network as claimed in claim 13 wherein the broker is a negotiating broker that receives from a user application or the adjacent network primitives associated with arguments that provide the broker with at least one range of acceptable values related to a specific aspect of a service offering, and the negotiating broker is adapted to negotiate a service offering having the aspect within the range of acceptable values.

19. A service capable network as claimed in claim 1 wherein the second logical layer is partitioned into nodal services that include transformation services, management services, transport services, connectivity services, quality of service (QOS) and brokerage services.

20. A service capable network as claimed in claim 19 wherein the second logical layer is further partitioned in to functions associated with a path and functions that are in a direct line of the path.

21. A service capable network as claimed in claim 1 wherein the network supports both connectionless and connection-oriented communications sessions.

22. A service capable network as claimed in claim 21 wherein the connectionless sessions may be best effort communications sessions without a guaranteed quality of service or a communications sessions with a guaranteed quality of service.

* * * * *